United States Patent
Felch

(10) Patent No.: US 10,095,895 B2
(45) Date of Patent: *Oct. 9, 2018

(54) ACTIVE USER IDENTIFICATION SYSTEM

(71) Applicant: WashSense, Inc., Santa Clara, CA (US)

(72) Inventor: Andrew Felch, Palo Alto, CA (US)

(73) Assignee: WashSense, Inc., Santa Clara, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/338,425

(22) Filed: Oct. 30, 2016

(65) Prior Publication Data
US 2017/0076121 A1    Mar. 16, 2017

Related U.S. Application Data

(63) Continuation of application No. 15/077,874, filed on Mar. 22, 2016, now Pat. No. 9,516,662.
(Continued)

(51) Int. Cl.
| | | |
|---|---|---|
| *H04W 4/00* | (2018.01) | |
| *G06K 7/10* | (2006.01) | |
| *H04W 72/08* | (2009.01) | |
| *H04W 4/02* | (2018.01) | |
| *H04W 48/00* | (2009.01) | |
| *H04W 52/04* | (2009.01) | |
| *H04W 52/28* | (2009.01) | |
| *H04W 52/32* | (2009.01) | |
| *H04W 64/00* | (2009.01) | |
| *H04L 12/24* | (2006.01) | |
| *H04B 17/318* | (2015.01) | |
| *H04L 29/08* | (2006.01) | |

(Continued)

(52) U.S. Cl.
CPC ....... *G06K 7/10366* (2013.01); *H04B 17/318* (2015.01); *H04L 41/0833* (2013.01); *H04L 67/12* (2013.01); *H04W 4/02* (2013.01); *H04W 40/244* (2013.01); *H04W 48/00* (2013.01); *H04W 52/04* (2013.01); *H04W 52/285* (2013.01); *H04W 52/325* (2013.01); *H04W 52/38* (2013.01); *H04W 64/00* (2013.01); *H04W 72/085* (2013.01); *H04L 43/16* (2013.01)

(58) Field of Classification Search
CPC .............. H04M 3/4931; H04M 3/4936; G08B 13/2462
See application file for complete search history.

(56) References Cited

U.S. PATENT DOCUMENTS

| | | | | |
|---|---|---|---|---|
| 8,122,026 | B1 * | 2/2012 | Laroco, Jr. ........ | G06F 17/30876 707/737 |
| 8,819,659 | B2 * | 8/2014 | Ramer .............. | G06F 17/30398 455/445 |

(Continued)

*Primary Examiner* — Melanie Jagannathan
(74) *Attorney, Agent, or Firm* — Robert Crownover

(57) ABSTRACT

A method and system can include: a station including a station communication unit, a station control unit, and a station storage unit; receiving transmissions of signals containing messages from beacons; detecting IDs from the messages; detecting a received strength of the signals; adding the IDs to a list; identifying one of the IDs as corresponding to an active user based on the list only having a single one of the IDs or based on a probability of the IDs being above a threshold, the active user being a user interfacing with the station; and disambiguating the IDs on the list based on the probability of the IDs being below the threshold.

17 Claims, 17 Drawing Sheets

Related U.S. Application Data

(60) Provisional application No. 62/217,699, filed on Sep. 11, 2015.

(51) Int. Cl.
*H04W 40/24* (2009.01)
*H04W 52/38* (2009.01)
*H04L 12/26* (2006.01)

(56) References Cited

U.S. PATENT DOCUMENTS

| | | | |
|---|---|---|---|
| 9,373,237 B1* | 6/2016 | Hoehn | G08B 13/2462 |
| 2004/0088285 A1* | 5/2004 | Martin | H04M 3/4931 |
| 2010/0203891 A1* | 8/2010 | Nagaraja | H04W 36/0055 |
| | | | 455/436 |
| 2011/0034168 A1* | 2/2011 | Lindoff | H04J 11/0086 |
| | | | 455/434 |
| 2012/0238268 A1* | 9/2012 | Radulescu | H04W 36/0061 |
| | | | 455/435.1 |
| 2013/0208643 A1* | 8/2013 | Butala | H04W 36/026 |
| | | | 370/312 |
| 2014/0044243 A1* | 2/2014 | Monegan | H04M 3/493 |
| | | | 379/88.01 |
| 2014/0357196 A1* | 12/2014 | Mayor | H04B 17/21 |
| | | | 455/67.11 |
| 2015/0147067 A1* | 5/2015 | Ryan | H04B 10/116 |
| | | | 398/118 |
| 2015/0334676 A1* | 11/2015 | Hart | H04W 4/029 |
| | | | 455/456.1 |
| 2016/0014609 A1* | 1/2016 | Goel | H04W 16/00 |
| | | | 370/254 |

* cited by examiner

ACTIVE USER IDENTIFICATION SYSTEM

CROSS-REFERENCE TO RELATED APPLICATIONS

This is a Continuation of U.S. patent application Ser. No. 15/077,874 filed Mar. 22, 2016, which claims priority benefit to all common subject matter of U.S. Provisional Patent Application Ser. No. 62/217,699 filed Sep. 11, 2015. The content of this application, in its entirety, is incorporated herein by reference.

TECHNICAL FIELD

This disclosure relates to automated identification systems, more particularly to beacon disambiguation systems.

BACKGROUND

With the advancement of mobile devices and machine automation, new ways of interfacing with technology are emerging. Users now have the ability to interact with automated systems in many environments.

One such interaction can take place in the field of automated compliance and monitoring systems, such as hand washing compliance systems in restaurants and hospitals. These automated systems can reduce many expenses including costs due to human error, employment costs, and costs of complexity arising from lack of standardization.

Automated systems of this kind are increasingly seen as invaluable in environments where compliance is crucial and alternatives are difficult and expensive to implement. Illustratively, it has been reported that more than 50% of all nosocomial infections can be directly related to the transmission of harmful bacteria by healthcare workers who have not properly washed their hands before and after each patient contact.

Thus, the best means to prevent transfer of these organisms from patient to patient and to reduce the emergence of resistant organisms is hand-washing with soap and water between patient contacts. The Centers for Disease Control and Prevention as well as other regulatory agencies recommend hand-washing before and after each patient encounter.

Automated compliance systems in a healthcare environment can increase compliance rates noticeably; however, the implementation of automated compliance systems is fraught with difficulties. Chief among these difficulties is distinguishing between multiple active users of the automated system in a streamlined and intuitive way that does not prohibitively increase the workload of the users, which can lead to an aversion to using the system.

The inability of automated systems to distinguish between multiple users can arise when an automated system is able to sense the presence of multiple users but the system is not able to sense other attributes of the users that would correlate with the user interacting with the system rather than being merely proximally close to the system.

Many previous developments have been advanced to address this problem. For example, some automated systems attempt to triangulate a user's position relative to a station. This triangulation method introduces the additional problems of requiring expensive and sophisticated antenna and power hungry components, both of which reduce the effectiveness and ability of the system to be implemented and adopted. Further the triangulation method can only provide partial results with substandard accuracy.

Effective solutions have been long sought but prior developments have not taught or suggested any, and solutions to these problems have long eluded those skilled in the art. Thus there remains a considerable need for devices and methods that can identify and disambiguate between multiple users.

SUMMARY

A beacon disambiguation system and methods, providing accurately identified and disambiguated users, are disclosed. The disambiguation system and methods can include: providing a station, the station including a station communication unit, a station control unit, and a station storage unit; receiving transmissions of signals containing messages from beacons, the transmissions received with the station communication unit; detecting IDs from the messages, the IDs detected by processing the messages with the station control unit; detecting a received strength of the signals, the received strength detected with the station communication unit; adding the IDs to a list, the list being stored in the station storage unit; identifying one of the IDs as corresponding to an active user based on the list only having a single one of the IDs or based on a probability of the IDs being above a threshold, the active user being a user interfacing with the station; disambiguating the IDs on the list based on the probability of the IDs being below the threshold, the IDs being disambiguated with the station control unit.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The disambiguation system is illustrated in the figures of the accompanying drawings which are meant to be exemplary and not limiting, in which like reference numerals are intended to refer to like components, and in which.

DETAILED DESCRIPTION

Figure 1:
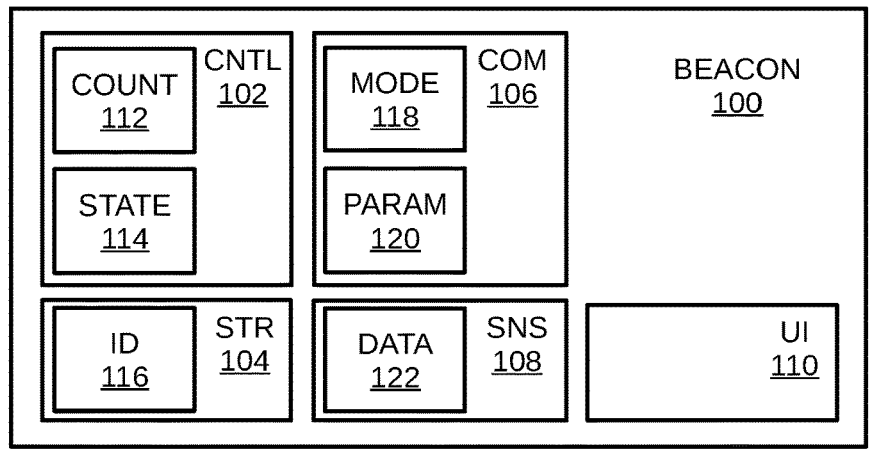
FIG. 1 is a block diagram of a beacon for use with the disambiguation system.

In the following description, reference is made to the accompanying drawings that form a part hereof, and in which are shown by way of illustration, embodiments in which the disambiguation system may be practiced. It is to be understood that other embodiments may be utilized and structural changes may be made without departing from the scope of the disambiguation system.

When features, aspects, or embodiments of the disambiguation system are described in terms of steps of a process, an operation, a control flow, or a flow chart, it is to be understood that the steps can be combined, performed in a different order, deleted, or include additional steps without departing from the disambiguation system as described herein.

The disambiguation system is described in sufficient detail to enable those skilled in the art to make and use the disambiguation system and provide numerous specific details to give a thorough understanding of the disambiguation system; however, it will be apparent that the disambiguation system may be practiced without these specific details.

In order to avoid obscuring the disambiguation system, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the disambiguation system can be operated in any orientation.

As used herein, the term system is defined as a device or method depending on the context in which it is used. For expository purposes, the term "horizontal" as used herein is defined as a plane parallel to the top plane or surface of the display, regardless of its orientation.

The term "vertical" refers to a direction perpendicular to the horizontal as just defined. Terms, such as "above", "below", "bottom", "top", "side", "higher", "lower", "upper", "over", and "under", are defined with respect to the horizontal plane. The term computer readable medium is defined as an article of manufacture.

Referring now to FIG. 1, therein is shown a block diagram of a beacon 100 for use with the disambiguation system. The beacon 100 is depicted as including a beacon control unit 102, a beacon storage unit 104, a beacon communication unit 106, a beacon sensor unit 108, and a beacon user interface 110.

The beacon control unit 102 can be implemented in a number of different manners. For example, the control unit can be a processor, an embedded processor, a microprocessor, a hardware control logic, a hardware finite state machine, a digital signal processor, or a combination thereof.

The beacon control unit 102 is depicted including a beacon counter 112 and a beacon state 114. The beacon counter 112 can provide a countdown before engaging the beacon user interface 110 to provide an audio notification. It is further contemplated that the beacon counter 112 can provide a count to trigger the beacon communication unit 106 for transmitting or receiving with the station 200 of FIG. 2.

The beacon state 114 can be used to set the operational state of the beacon 100. Illustratively the operational state of the beacon 100 can include counting down with the beacon counter 112, transmitting or receiving with the beacon communication unit 106, waiting, signaling a user with the beacon user interface 110, and reading the beacon sensor unit 108.

The beacon storage unit 104 can be a volatile memory, a nonvolatile memory, an internal memory, an external memory, or a combination thereof. For example, the storage unit can be a nonvolatile storage such as random access memory, flash memory, disk storage, or a volatile storage such as static random access memory.

The beacon storage unit 104 can include a user ID 116. The user ID 116 can be a single unique identifier for each of the beacons 100 used with the disambiguation system.

The beacon communication unit 106 can be implemented with antennas, and transceivers. The beacon communication unit 106 can include beacon communication modes 118 and beacon parameters 120. The beacon communication modes 118 can include receive, transmit, and low power.

The beacon parameters 120 can be used to control various parameters of the beacon communication unit 106 such as signal strength during transmission, transmission signal frequency, wait times between transmissions, length of transmission times, transmission of beacon sensor data 122 collected by the beacon sensor unit 108, transmission of the user ID 116, wait times between receptions, and length of reception times. The beacon parameters 120 can be stored in the beacon storage unit 104.

The beacon sensor unit 108 can be various sensors such as a magnetometer, a gyroscope, an accelerometer, a thermopile or a combination thereof. The beacon sensor unit 108 can produce the beacon sensor data 122.

For example, it is contemplated that when the beacon sensor unit 108 is implemented as a magnetometer, a gyroscope, and an accelerometer, the magnetometer and the gyroscope can be used to produce the beacon sensor data 122 indicating the direction the beacon 100 is pointing, while the accelerometer can produce the beacon sensor data 122 indicating an acceleration of the beacon 100.

The beacon sensor data 122 for the beacon sensor unit 108 can be combined in this example to indicate a direction of travel of the beacon 100 as well as distance and speed that the beacon 100 travels. It is contemplated that the beacon sensor unit 108 can implement an accelerometer to produce the beacon sensor data 122 indicating the acceleration, speed, and distance that the beacon 100 travels without indicating the direction.

It is further contemplated that the beacon sensor unit 108 can be implemented as a thermopile and can produce the beacon sensor data 122 that indicates a position or movement of a heat source relative to the beacon 100. For example, it is contemplated that the beacon sensor unit 108 can be a thermopile array sensor and that the beacon sensor data 122 produced can indicate positions and direction of movement, independent of ambient light conditions.

It is contemplated that the beacon 100 could transmit the beacon sensor data 122 as it is read or could store the beacon sensor data 122 in the beacon storage unit 104 for later transmission or processing by the beacon control unit 102. For instance, the beacon sensor data 122 indicating the acceleration of the beacon 100 can be integrated in the beacon control unit 102 to provide a velocity of the beacon 100 and could be further processed to provide a distance that the beacon 100 moved over a particular timeframe.

The beacon sensor data 122 processed by the beacon control unit 102 can further be stored in the beacon storage unit 104 and transmitted by the beacon communication unit 106. The beacon sensor data 122 can be transmitted based on and in accordance with the beacon state 114, the beacon communication modes 118, and the beacon parameters 120.

The beacon user interface 110 can provide a visual indicator, an audio indicator, and a haptic indicator. For example the beacon user interface 110 can provide visual indicators when implemented as LED lights providing visual indications by blinking, color, and brightness. The visual indicator can further provide visual indicators when implemented as an LED or LCD display providing symbols or graphical indicators.

As a further example the beacon user interface 110 can provide audio indicators when implemented as a speaker providing audio indications by beeping, chiming, or speaking. As yet a further example the beacon user interface 110 can provide haptic indicators when implemented as a vibration motor providing haptic indications by vibrating and twitching.

It will be understood by those having ordinary skill in the art that when the beacon 100 is described to execute, run, calculate, or initiate, the beacon 100 can utilize the beacon control unit 102 to execute, run, calculate, or initiate. It will be further understood by those having ordinary skill in the art that when the beacon 100 is described to set, update, or save, the beacon 100 can utilize the beacon storage unit 104 to set, update, or save.

It will be further understood by those having ordinary skill in the art that when the beacon 100 is described to send, transmit, or receive, the beacon 100 can utilize the beacon communication unit 106 to send, transmit, or receive. It will be further understood by those having ordinary skill in the art that when the beacon 100 is described to count or countdown, the beacon 100 can utilize the beacon counter 112 to count or countdown.

Figure 2:
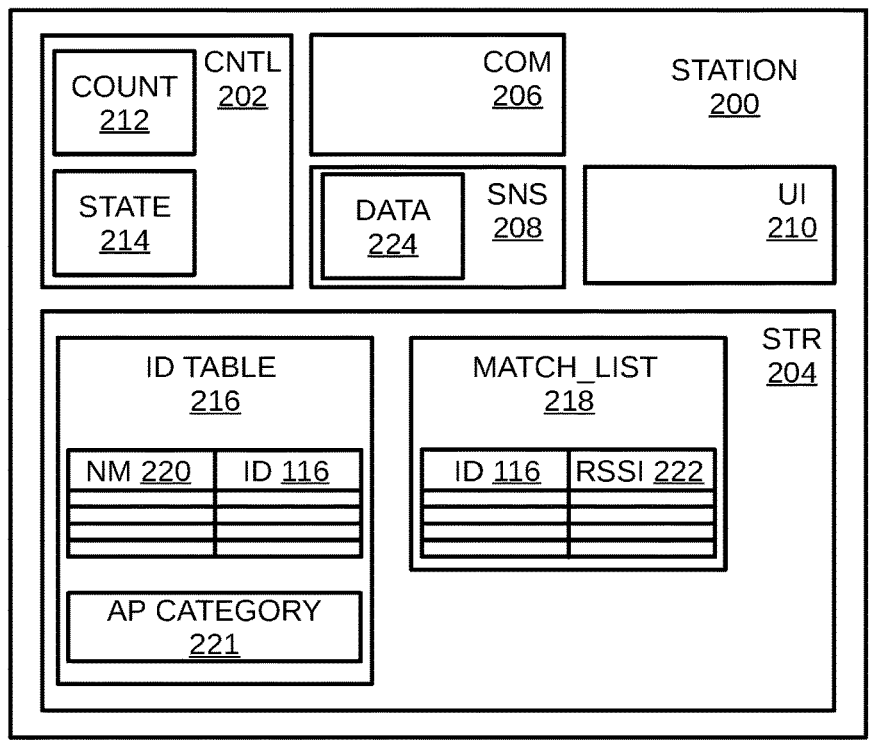
FIG. 2 is a block diagram of a station for use with the disambiguation system.

Referring now to FIG. 2, therein is shown a block diagram of a station for use with the disambiguation system. The station 200 is depicted as including a station control unit 202, a station storage unit 204, a station communication unit 206, a station sensor unit 208, and a station user interface 210.

The station control unit 202 can be implemented in a number of different manners. For example, the control unit can be a processor, an embedded processor, a microprocessor, a hardware control logic, a hardware finite state machine, a digital signal processor, or a combination thereof.

The station control unit 202 is depicted including a station counter 212 and a station state 214. The station counter 212 can provide a countdown until the end of a hygiene session. The countdown provided by the station counter 212 can be displayed on the station user interface 210 along with triggering notifications of a completed hygiene session. It is further contemplated that the station counter 212 can provide a count to trigger the station communication unit 206 for transmitting or receiving with the beacon 100 of FIG. 1.

The station state 214 can be used to set the operational state of the station 200. Illustratively the operational state of the station 200 can include counting down with the station counter 212, transmitting or receiving with the station communication unit 206, waiting, signaling a user with the station user interface 210, and reading the station sensor unit 208.

The station storage unit 204 can be a volatile memory, a nonvolatile memory, an internal memory, an external memory, or a combination thereof. For example, the storage unit can be a nonvolatile storage such as random access memory, flash memory, disk storage, or a volatile storage such as static random access memory.

The station storage unit 204 can include a user ID table 216 and a Match_List 218. The user ID table 216 can include a list of user names 220 associated with the user IDs 116 of FIG. 1 for each of the beacons 100. It is further contemplated that the user ID table 216 can include only those user IDs 116 that are authorized or known to use the station 200.

The user ID table 216 can further include an approved category 221. The approved category 221 can be a class or group of the user IDs 116 that the station 200 can recognize as valid users without the actual user IDs 116 being contained within the user ID table 216. It is contemplated that the user IDs 116 can include information indicating whether the beacon 100 having the user IDs 116 belong to the approved category 221.

The Match_List 218 can include a list of the user IDs 116 associated with a received signal strength indicator (RSSI) 222. The station 200 can detect the user ID 116 and the RSSI 222 for each of the beacons 100 that are close to the station 200. It is contemplated that the station 200 can detect RSSI 222, which can be the highest RSSI for the beacon 100, an average RSSI for the beacon 100, or the lowest RSSI for the beacon 100, each measured over a window of time.

The station communication unit 206 can communicate with the beacon communication unit 106 of FIG. 1 of the beacon 100. The station communication unit 206 can enable two-way communication with the beacon 100 and can be implemented with antennas, and transceivers.

The station sensor unit 208 can be various sensors such as thermal sensors, digital video sensors, or motion sensors. The motion sensors are contemplated to be passive infrared motion sensors, microwave motion sensors, ultrasonic motion sensors, or tomographic motion sensors.

The station sensor unit 208 can produce the station sensor data 224. For example, it is contemplated that when the station sensor unit 208 is implemented as a thermal sensor, the station sensor unit 208 could produce the station sensor data 224 that indicates a position or movement of a heat source relative to the station 200.

It is contemplated that the station 200 could store the station sensor data 224 in the station storage unit 204. It is further contemplated that the station sensor data 224 could further be processed by the station control unit 202. The station sensor data 224 processed by the station control unit 202 can further be stored in the station storage unit 204.

The station user interface 210 can provide a visual indicator, and an audio indicator. The station user interface 210 can include a display, speakers, and can also include a keypad, a touchpad, soft-keys, a keyboard, and a microphone.

It will be understood by those having ordinary skill in the art that when the station 200 is described to execute, run, calculate, or initiate, the station 200 can utilize the station control unit 202 to execute, run, calculate, or initiate. It will be further understood by those having ordinary skill in the art that when the station 200 is described to set, update, save, or add and remove information, the station 200 can utilize the station storage unit 204 to set, update, save, or add and remove information.

It will be further understood by those having ordinary skill in the art that when the station 200 is described to send, transmit, or receive, the station 200 can utilize the station communication unit 206 to send, transmit, or receive. It will be further understood by those having ordinary skill in the art that when the station 200 is described to count or countdown, the station 200 can utilize the station counter 212 to count or countdown.

Figure 3:
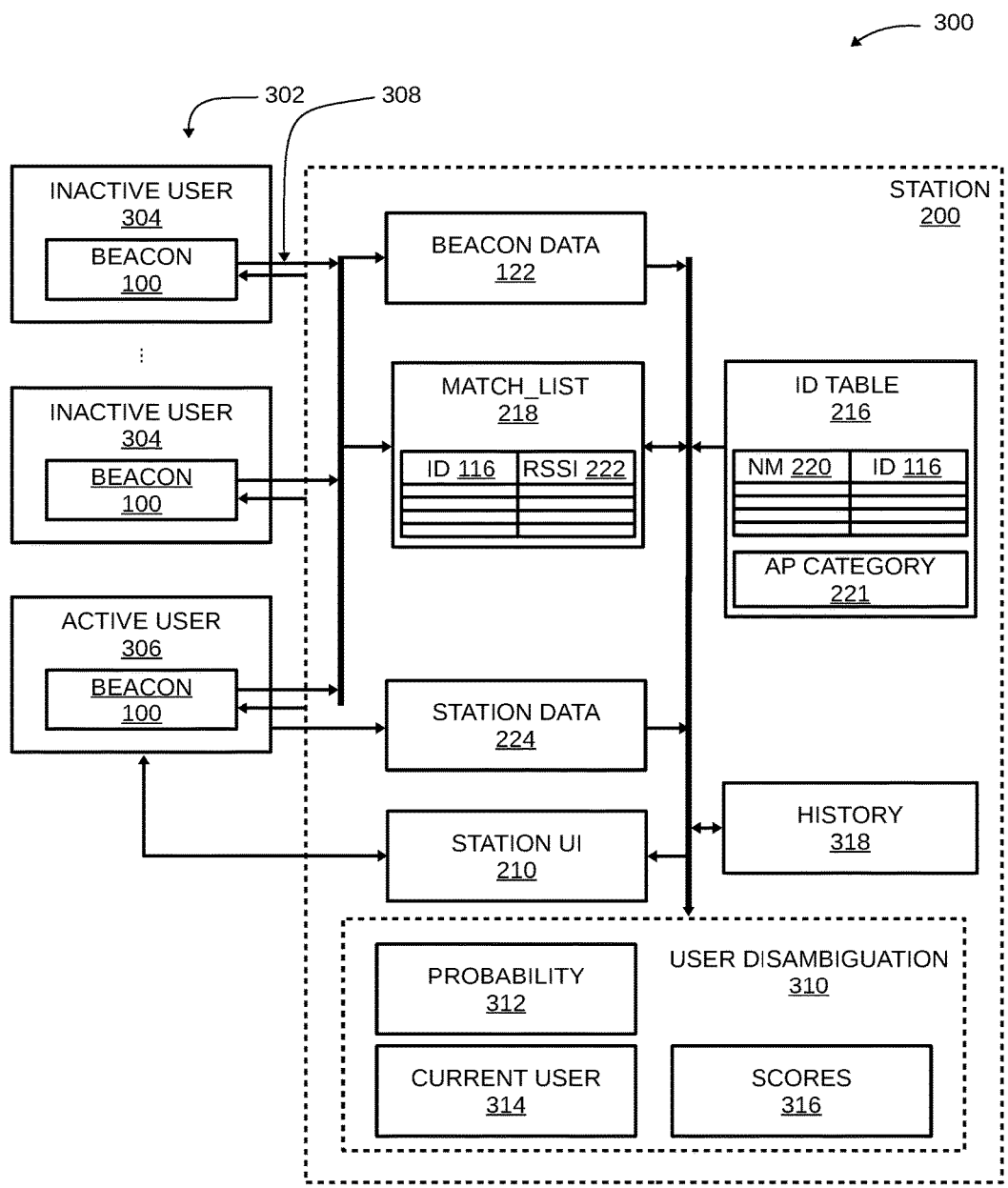
FIG. 3 is a diagrammatic overview of the disambiguation system.

Referring now to FIG. 3, therein is shown a diagrammatic overview of the disambiguation system 300. The disambiguation system 300 is depicted having the beacons 100 physically attached to users 302 near the station 200. The users 302 can include inactive users 304 and an active user 306 that are proximal to the station 200.

The active user 306 is one of the users 302 that is currently interacting with the station 200 while the inactive users 304 are the users 302 that are near the station 200 but are not currently interacting with the station 200. The beacons 100 are shown transmitting a signal 308. The signal 308 can be transmitted from the beacon communication unit 106 of FIG. 1 to the station communication unit 206 of FIG. 2. The station communication unit 206 can detect the signal 308 from the beacons 100 when the station 200 scans for the signal 308.

The signal 308 can include the beacon sensor data 122 and the user ID 116. The signal 308 can also be used to determine the RSSI 222 of the beacon 100 transmitting the signal 308. The beacon sensor data 122 along with the RSSI 222 and the user ID 116 can be stored in the station storage unit 204 of FIG. 2.

The signal 308 is depicted as a one-way communication from the beacons 100 providing the beacon sensor data 122 and populating the Match_List 218; however the station 200 is shown to also transmit the signal 308 to the beacons 100. For example the station 200 will transmit the signal 308 to the beacons 100 when updating and changing the beacon communication modes 118 of FIG. 1, the beacon parameters 120 of FIG. 1, or the beacon state 114 of FIG. 1.

The signal 308 transmitted from the station 200 can further be used to signal the users 302 wearing the beacons 100. Illustratively, when the disambiguation system 300 is used for hand washing compliance, the station 200 can transmit the signal 308 to the beacons 100 to display instructions for a type of wash on the user interface 110 of FIG. 1; such as, displaying instructions to wash with soap and water instead of alcohol during a subsequent cleansing.

The station 200 can also transmit the signal 308 triggering the beacon user interface 110 to display the number of washes the users 302 have performed during a current day. It is contemplated that the signal 308 from the station 200 to the beacon 100 could further include an amount of time the beacon 100 should wait before the beacon user interface 110 sounds a tone indicating that an alcohol scrub which the users 302 are currently performing is complete.

In some contemplated embodiments, the signal 308 can be implemented as a Bluetooth or WiFi signal 308. For descriptive clarity, the information within the station 200 is shown collected in busses, which are indicated with thicker line widths while the direction of information travel is depicted with directional arrows.

It is contemplated that the signal 308 transmitted from the beacons 100 can include can include a sub-field of information indicating whether the beacons 100 belong to the approved category 221. It is contemplated that the approved category 221 may be used to identify one of the users 302 that is authorized to use the station 200 but whose full individual user ID 116 is not previously stored on the station 200. It is contemplated that the sub-field of information can be contained in the user ID 116 or other portions of the signal 308 from the beacons 100.

Furthermore, the signal 308 from the beacons 100, including the user IDs 116, to the station 200 can include plain or encrypted user name 220 information, which could allow the station 200 to create a new entry on the Match_List 218 for the user 302. Adding one of the users 302 in this manner could require that the user ID 116 and the user name 220 information sent from the beacon 100 be signed by a trusted source.

The station 200 can further detect the station sensor data 224 by detecting the active user 306 with the station sensor unit 208 of FIG. 2. Illustratively, the station sensor data 224 could include position, movement, or a combination thereof for the active user 306 with respect to the station 200.

The beacon sensor data 122, the user ID 116, the RSSI 222, and the station sensor data 224 can be fed into a user disambiguation block 310. The user disambiguation block 310 can be process steps implemented within the station control unit 202 of FIG. 2 and having results stored in the station storage unit 204.

Specifically, the user disambiguation block 310 can provide probabilities 312. The probabilities 312 can be the probability 312 that the user disambiguation block 310 assigns to the inactive users 304 and the probability 312 the user disambiguation block 310 assigns to the active user 306.

The user disambiguation block 310 can further provide a current user 314. The current user 314 is one of the users 302 that the user disambiguation block 310 determines is the most likely candidate for the active user 306.

The Match_List 218 is depicted having two-way data flow with the user disambiguation block 310. It is contemplated that the user disambiguation block 310 can update the Match_List 218 with the users 302 that are the most relevant. The user disambiguation block 310 can delete the users 302 that are not known to be in the user ID table 216 or that have a low probability 312 of being the active user 306.

The user disambiguation block 310 can match the beacon sensor data 122 to the station sensor data 224. The comparison of the beacon sensor data 122 to the station sensor data 224 can result in scores 316.

The scores 316 can be used to determine the probability 312 that any one of the beacons 100 corresponds to the active user 306. The user disambiguation block 310 can further assess aspects of the signal 308 like the RSSI 222 to determine the probability 312 that the beacons 100 corresponds to the active user 306.

The user disambiguation block 310 can compare the scores 316 and the RSSI 222 to a history record 318 to provide the probabilities 312 of the users 302 and the current user 314. The history record 318 can be stored on the station storage unit 204 and can be updated by the user disambiguation block 310 with current scores 316 and RSSI 222 data.

Once the user disambiguation block 310 has determined the current user 314 having the probability 312 above a threshold, the user disambiguation block 310 can correlate the user ID 116 of the current user 314 to the user names 220 within the user ID table 216 and the disambiguation will stop. If the user disambiguation block 310 does not determine the current user 314 with the probability 312 above a threshold the disambiguation will continue.

The user disambiguation block 310 can provide the user name 220 of the current user 314 to the station user interface 210. The station user interface 210 can display the user name 220 of the current user 314 on the station user interface 210 to the active user 306.

The station user interface 210 can further display the probabilities 312 and other supporting results of the disambiguation process to the active user 306. It is contemplated that the active user 306 can verify whether the user disambiguation block 310 has indicated the correct current user 314. The input of the active user 306 can be stored in the history record 318 for calculating the probabilities 312 of the users 302 in the future.

The station user interface 210 can also provide an output to the active user 306 that can induce an expected movement from the active user 306. This movement by the active user 306 can be identified by the station sensor unit 208 as the station sensor data 224 as well as being identified by the beacon sensor unit 108 of FIG. 1 as the beacon sensor data 122.

Figure 4:
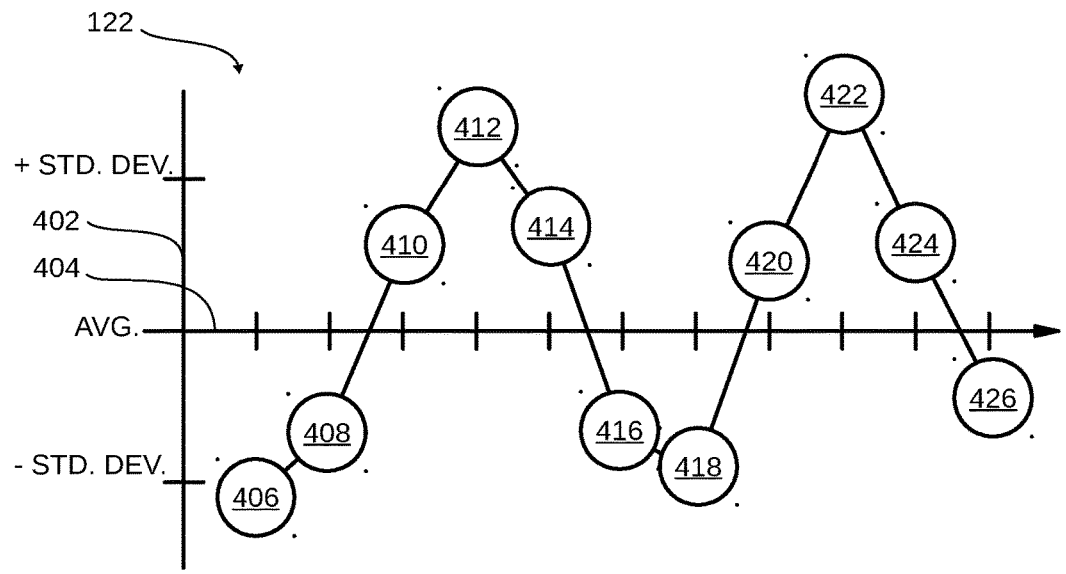
FIG. 4 is a graphical view of the beacon sensor data of FIG. 1.

Referring now to FIG. 4, therein is shown a graphical view of the beacon sensor data 122 of FIG. 1. The beacon sensor data 122 can be illustratively arranged having an accelerometer force 402 in standard deviations along a y-axis and time 404 along an x-axis.

The beacon sensor data 122 can be the force sensed by the beacon sensor unit 108 of FIG. 1. The beacon sensor data 122 can be graphed to have early readings of the beacon sensor data 122 on the left and readings of the beacon sensor data 122 later in time to the right. That is the time 404 values of the x-axis move from earlier on the left to later on the right.

For ease of description the beacon sensor data 122 will be described of being comprised of accelerations from 406 to 426. The beacon sensor data 122 is depicted showing accelerations 406 and 408 in a negative direction, which is indicated by the accelerations 406 and 408 being below the average.

The accelerations 410, 412, and 414 are subsequently depicted in a positive direction, which is indicated by the accelerations 410, 412, and 414 being above the average. The accelerations 416 and 418 are subsequently depicted in a negative direction. Following the accelerations 416 and 418, the accelerations 420, 422, and 424 are depicted in a positive direction.

Lastly, acceleration 426 is depicted in a slightly negative direction. As can be appreciated, greater accelerations are depicted further away from the average while smaller accelerations are depicted closer to the average.

As is depicted the accelerations 406 to 426 are normalized by standard deviation, which allows the standard deviation to be a dimensionless measure of the accelerometer force 402. Further, the mean is depicted as subtracted from the standard deviations of the accelerations 406 to 426 allowing a depiction of negative values for the accelerometer force 402 when the accelerometer force 402 is either only positive or only negative.

It will be appreciated that normalizing the beacon sensor data 122 by standard deviation and subtracting the mean allows the beacon sensor data 122 detected as acceleration forces to be compared with the station sensor data 224 of FIG. 2 detected as motion. This will be evident from comparing the beacon sensor data 122 depicted in FIG. 4 with the station sensor data 224 depicted in FIG. 5.

That is, the beacon sensor data 122 detected as positive acceleration at the beacon sensor unit 108 can be normalized and shifted about the mean so that the accelerations can be viewed as positive and negative accelerations. The beacon sensor data 122 can be normalized and shifted in the beacon control unit 102 of FIG. 1 and stored in the beacon storage unit 104 of FIG. 1 before being transmitted to the station 200. Alternatively, the beacon sensor data 122 can be transmitted to the station 200 and can be normalized and shifted in the station control unit 202 of FIG. 2.

Figure 5:
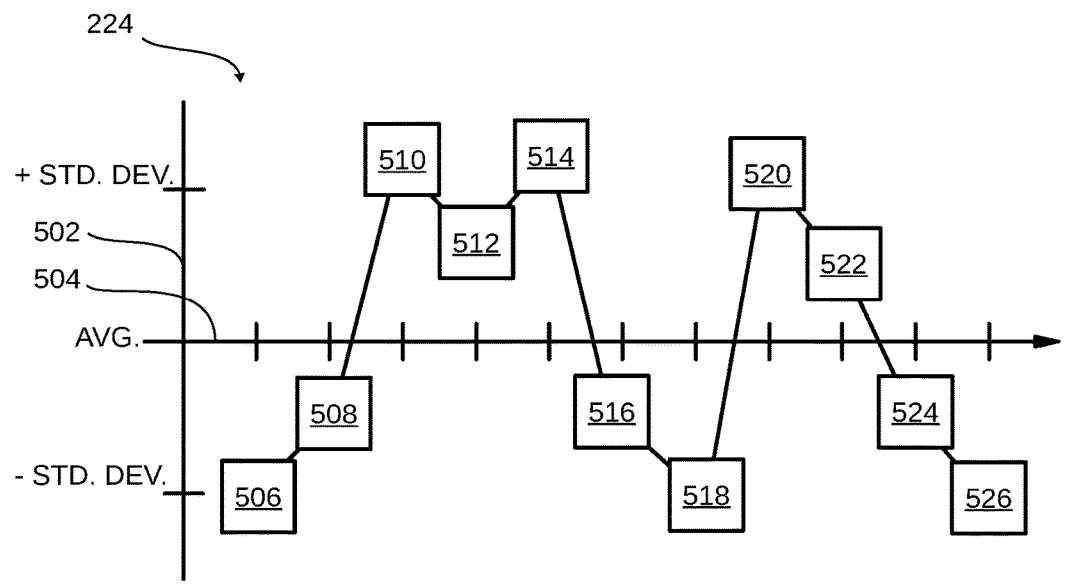
FIG. 5 is a graphical view of the station sensor data of FIG. 2.

Referring now to FIG. 5, therein is shown a graphical view of the station sensor data 224 of FIG. 2. The station sensor data 224 can be illustratively arranged having a motion 502 in standard deviations along a y-axis and time 504 along an x-axis.

The station sensor data 224 can be the motion sensed by the station sensor unit 208 of FIG. 2. The station sensor data 224 could also be the rate-of-change of the motions sensed by the station sensor unit 208. When representing rate-of-change of motion, a still, slow, or fast motion maintained over a certain time will be seen as not changing or changing very little over that time, and a motion going from fast to slow or slow to fast, or changing directions, may be seen as a high motion rate-of-change.

Illustratively, the station sensor unit 208 could be a motion sensor like a thermopile. In this illustrative example, the station sensor unit 208 could detect an increase in heat in one sector of the station sensor unit 208 and a decrease in heat in a different sector of the station sensor unit 208.

Detecting an increase in heat or decrease in heat can be interrelated or independent. A change in the heat detected by the station sensor unit 208 could be correlated to movement of the active user 306 of FIG. 3. The increase in heat detected by the station sensor unit 208 can be viewed as positive motion where a decrease in heat can be viewed as negative motion.

The station sensor data 224 can be graphed to have early readings of the station sensor data 224 on the left and readings of the station sensor data 224 later in time to the right. That is the time 504 values of the x-axis move from earlier on the left to later on the right.

For ease of description the station sensor data 224 will be described of being comprised of motions from 506 to 526. The station sensor data 224 is depicted showing motions 506 and 508 in a negative direction, which is indicated by the motions 506 and 508 being below the average.

The motions 510, 512, and 514 are subsequently depicted in a positive direction, which is indicated by the motions 510, 512, and 514 being above the average. The motions 516 and 518 are subsequently depicted in a negative direction. Following the motions 516 and 518, the motions 520 and 522 are depicted in a positive direction.

Lastly, motions 524 and 526 are depicted in a negative direction. As can be appreciated, larger motions are depicted further away from the average while smaller motions are depicted closer to the average.

As is depicted the motions 506 to 526 are normalized by standard deviation, which allows the standard deviation to be the dimensionless measure of the motion 502. Further, the mean is depicted as subtracted from the standard deviations of the motions 506 to 526 allowing a depiction of negative values for the motions 502 when the motion 502 is either only positive or only negative.

It will be appreciated that normalizing the station sensor data 224 by standard deviation and subtracting the mean allows the station sensor data 224 detected as motions to be compared with the beacon sensor data 122 of FIG. 1 detected as accelerations. This will be evident from comparing the station sensor data 224 depicted in FIG. 5 with the beacon sensor data 122 depicted in FIG. 4.

That is, the station sensor data 224 detected as positive motion at the station sensor unit 208 can be normalized and shifted about the mean so that the motions can be viewed as positive and negative motions. The station sensor data 224 can be normalized and shifted in the station control unit 202 of FIG. 2.

The station sensor data 224 can be compared with the beacon sensor data 122 to produce the scores 316 of FIG. 3. The scores 316 can be a measurement of how closely the station sensor data 224 matches or correlates to the beacon sensor data 122.

Multiple methods are contemplated for comparing the similarity of the beacon sensor data 122 to the station sensor data 224. One such method is the cross-correlation, which is commonly used for comparing one series of data collected over time to another such series. A higher correlation will produce a larger score 316 and indicate that the beacon 100 of FIG. 1 is more likely to be attached to the active user 306 that was performing the motions detected by the station sensor unit 208 of the station 200 of FIG. 2.

It is contemplated that when scores 316 are larger, the beacons 100 associated with the larger score 316 will be maintained as a candidate for the current user 314 of FIG. 3 on the Match_List 218 of FIG. 2. Conversely, when the scores 316 are lower, the beacons 100 associated with the lower score 316 might be removed as a candidate for the current user 314 on the Match_List 218.

It is contemplated that the beacon sensor data 122 for each of the beacons 100 can be compared to the station sensor data 224 to produce the scores 316 for each of the beacons 100. It is further contemplated that if only one of the beacons 100 is determined to have the score 316 indicating correlation between the beacon sensor data 122 and the station sensor data 224, then the user ID 116 of FIG. 1 of the correlating beacon 100 can be assigned or designated as the current user 314.

The history record 318 of FIG. 3 can then be updated with information about the current user 314. For example, when the disambiguation system 300 of FIG. 3 is implemented in a hand washing compliance system 300, the history record 318 could be updated to include not only information about the score 316 and probability 312 of FIG. 3 that the beacon 100 should be identified with the current user 314 but also information about the hand wash process itself, like how long the wash lasted, how many times the current user 314 washed during the day, and how many times the current user 314 used an alcohol scrub as an alternative to a soap and water wash. This information stored in the history record 318 can be used for later reporting and analysis.

Another contemplated method for comparing the beacon sensor data 122 with the station sensor data 224 are to compare Fourier transforms of the beacon sensor data 122 and the station sensor data 224. Yet another contemplated method for comparing the beacon sensor data 122 with the station sensor data 224 is to compare the spectrograms of the beacon sensor data 122 to the station sensor data 224.

In some contemplated embodiments it would be helpful to de-noise the beacon sensor data 122 and the station sensor data 224. The beacon sensor data 122 and the station sensor data 224 can be de-noised for example, by subtracting out oscillations that are known to occur with motions other than the motions detectable by the station sensor unit 208.

Illustratively, when the disambiguation system 300 is used in a mobile platform where the users 302 of FIG. 3 are walking, the beacon sensor data 122 might capture the acceleration from the walking motion of the users 302. The beacon sensor data 122 oscillating at a frequency known to be generated by the users 302 walking could be filtered out, which could help to improve the accuracy of the score 316 and subsequently the probability 312 of correctly identifying the current user 314.

Other beacon sensor data 122 that can be filtered out can come from identifying or categorizing the beacon sensor data 122 as coming from other motions of the active user 306 such as a continued scrubbing motion. Although the beacon sensor data 122 indicating a scrubbing motion could be filtered out for purposes of correlating the beacon sensor data 122 to the station sensor data 224, the beacon sensor data 122 indicating a scrubbing motion could be used by the disambiguation system 300 to verify hand wash compliance.

In other contemplated embodiments, either the beacon sensor data 122 or the station sensor data 224 might repeat at double the frequency of the other. Means of comparing the beacon sensor data 122 with the station sensor data 224 in these situations is still possible. One such contemplated method for comparing the beacon sensor data 122 with the station sensor data 224 would be to determine the likelihood that the period of oscillation in one set of data is an integer multiple of the period of oscillation in the other set of data.

The correlation and de-noising can be performed on the station control unit 202 from raw data from the beacons 100. Alternatively, some or all of the correlations and de-noising could be performed on the beacon control unit 102 of FIG. 1 and transmitted to the station 200 along with the raw beacon sensor data 122.

Figure 6:
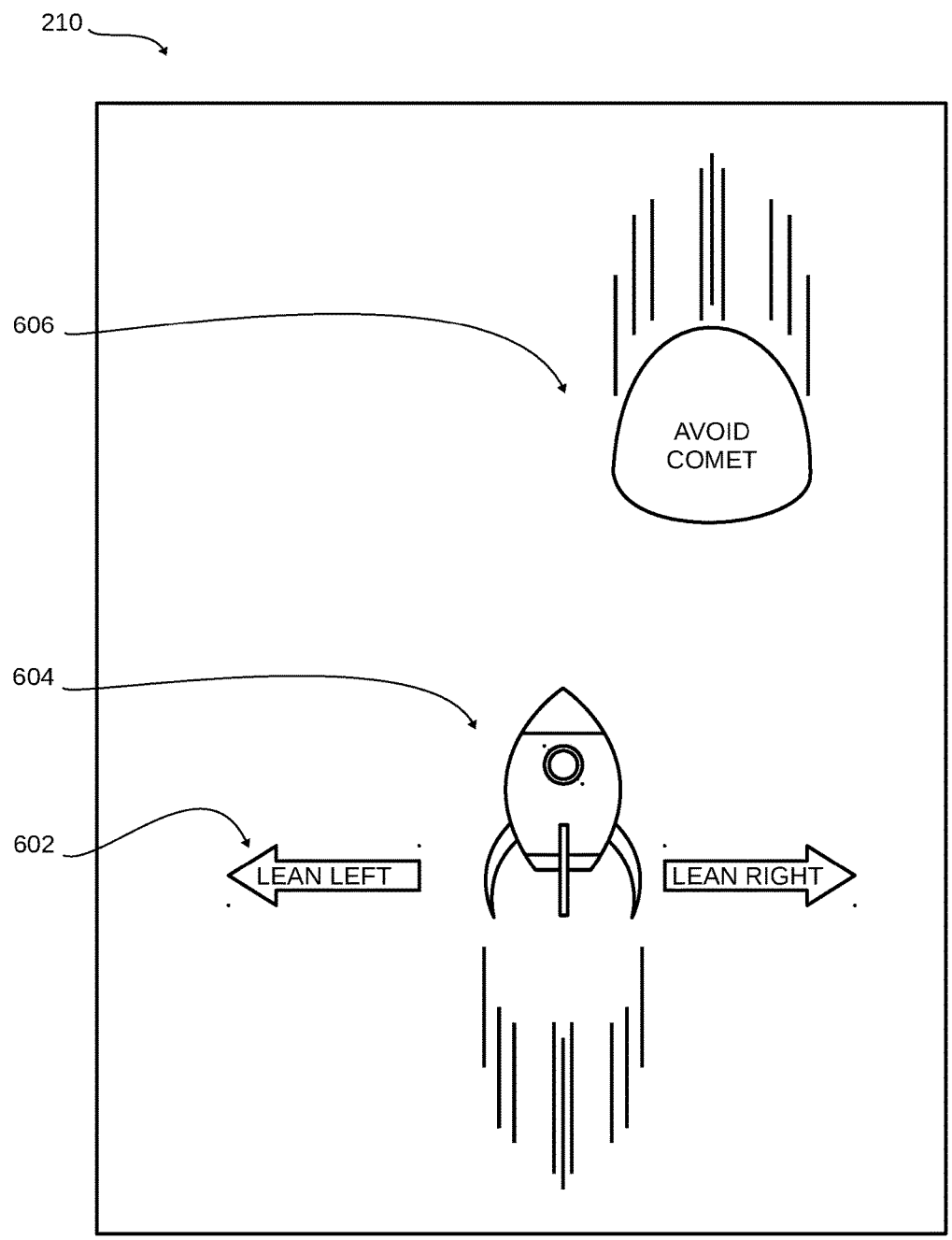
FIG. 6 is a graphical view of the station user interface of FIG. 2.

Referring now to FIG. 6, therein is shown a graphical view of the station user interface 210 of FIG. 2. The station user interface 210 can be used to induce movement of the active user 306 of FIG. 3 to provide the beacon sensor data 122 of FIG. 1 and the station sensor data 224 of FIG. 2 to the user disambiguation block 310 of FIG. 3 for determining the current user 314 of FIG. 3.

The station user interface 210 is depicted as a screen including graphics. Illustratively, station user interface 210 can depict a game and provide instructions 602 to the active user 306 to control a space ship 604 with the motions of the active user 306 and to attempt to keep the space ship 602 from being hit by a comet 606.

The comet 606 is depicted hurdling toward the space ship 604. The instructions 602 can explain to the active user 306 that leaning to the left causes the space ship 604 to move to the left, whereas leaning to the right causes space ship 604 to move to the right.

It is contemplated that the station communication unit 206 of FIG. 2 can scan for the signals 308 transmitted by the beacons 100 of FIG. 1. The signals 308 from the beacons 100 can contain the beacon sensor data 122 of FIG. 1 including orientation and accelerometer forces.

Once the station 200 detects the beacon sensor data 122 that indicates one of the users 302 has moved in a way appropriate to avoid the comet, the station 200 will depict the space ship 604 as moving on the station user interface 210. Specifically, the beacon sensor data 122 indicating a change in the orientation of the beacon 100 with respect to gravity can be understood as a leaning motion.

The beacon sensor data 122 can convey to the station 200 a number of degrees that the orientation of the beacon 100 changed with respect to gravity. The station 200 can provide visual feedback to the active user 306 through the station user interface 210 by moving the space ship 604 more for a larger orientation change of the beacon 100 and less for a smaller orientation change of the beacon 100.

It is contemplated that the game displayed on the station user interface 210 can be designed to produce a specific movement. In the illustrative example of FIG. 6, the comet 606 hurdling toward the space ship 604 should elicit a left lean by the active user 306 because leaning right would move the space ship 604 closer to the path of the comet 606.

In this way, the user disambiguation block 310 of the station 200 can identify the active user 306 from the inactive users 304 of FIG. 3 because the inactive users 304 will not react to the station user interface 210 by leaning as the active user 306 is expected to.

It is contemplated that the station 200 can assign an initial motion of the active user 306 to be the specific motion elicited by the game. A motion by the active user 306 in the opposite direction will be assigned to a motion opposite the specific motion elicited by the game. In this way, the station 200 can recognize motions of the active user 306 and accurately control the space ship 604 even when the active user 306 is wearing the beacon 100 upside down or backwards.

It is contemplated that once the beacon 100 associated with the active user 306 is identified, the user ID 116 of FIG. 1 for the active user 306 can be correlated with the user name 220 of FIG. 2 and displayed to the active user 306 through the station user interface 210. Information specific to the active user 306 can also be provided to the active user 306 through the station user interface 210 such as displaying family photos, displaying messages that have arrived for the active user 306, or playing the active user's 306 favorite music. The active user 306 will also be identified as the current user 314 and information about the interaction of the current user 314 with the station 200 along with the beacon sensor data 122 for the current user 314 can be stored in the history record 318 of FIG. 3.

In the situation where none of the beacons 100 for the users 302 transmits the beacon sensor data 122 indicating a motion that would be expected by one of the users 302 actively engaging with the station user interface 210, the station 200 can assign the active user 306 an "Unknown ID". This can be an indication that the active user 306 is not wearing the beacon 100 or that the beacon 100 may be non-functional.

If the active user 306 is assigned the Unknown ID, the station 200 can prompt the active user 306 to display a hand sign that the active user 306 can later display to their phone to claim credit for interacting with the station 200. When the active user 306 is verified the information for the interaction of the active user 306 with the station 200 can be stored in the history record 318 for the active user 306.

Further it is contemplated that when the user disambiguation block 310 initially identifies the user ID 116 of the active user 306 having a lower probability 312 of FIG. 3, and subsequently determines that the score 316 of FIG. 3 for the correlation between the beacon sensor data 122 and the station sensor data 224 is too low, the station 200 can change from displaying the user ID 116 to the Unknown ID.

Figure 7:
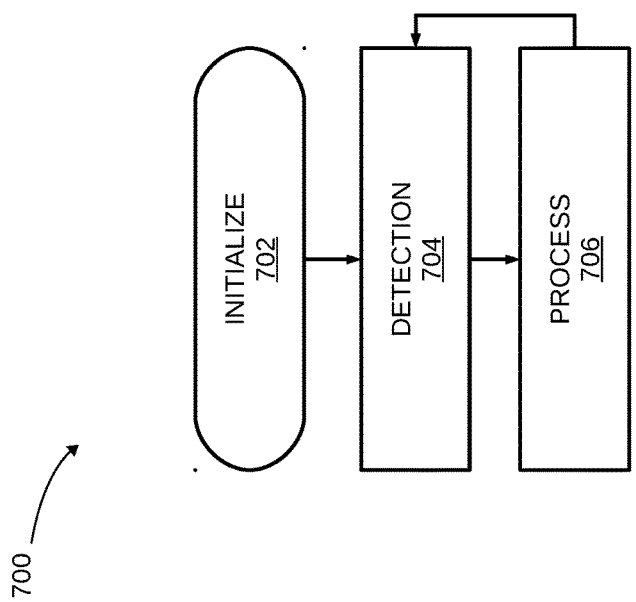
FIG. 7 is a user engagement control flow for the disambiguation system of FIG. 3.

Referring now to FIG. 7, therein is shown an engagement control flow 700 for the disambiguation system 300 of FIG. 3. The engagement control flow 700 is contemplated to illustrate an embodiment of the disambiguation system 300 when implemented with a hand wash compliance system.

The engagement control flow 700 can illustrate how the active user 306 of FIG. 3 engages with the station 200 of FIG. 2. In an initialize step 702, the users 302 of FIG. 3 can attach the beacons 100 of FIG. 1 to their persons and power the beacons 100 on.

Further in the initialize step 702 it is contemplated that the active user 306 will approach the station 200. The inactive users 304 of FIG. 3 can also proceed near the station 200.

When the active user 306 approaches the station 200, the station 200 can proceed to a detection step 704. The detection step 704 can detect the beacon sensor data 122 of FIG. 1 transmitted by the signal 308 of FIG. 3 from the beacon communication unit 106 of FIG. 1.

The detection step 704 can also be implemented to detect the station sensor data 224 of FIG. 2 from the station sensor unit 208 of FIG. 2 indicating the motions of the active user 306.

The station 200 can then initiate a process step 706. The process step 706 can be used to process the beacon sensor data 122 and the station sensor data 224 in the user disambiguation block 310 of FIG. 3 to provide the user ID 116 of FIG. 1 and the user names 220 of FIG. 2. The process step 706 can further provide an analysis of the hand washing compliance of the active user 306 and display the analysis to the active user 306 with the station user interface 210 of FIG. 2.

In the situation where the station 200 is used by multiple users 302 one after another, the process step 706 can be completed by the station 200 for the active user 306 then the station 200 could initiate the detection step 704 again for subsequent users 302.

Figure 8:
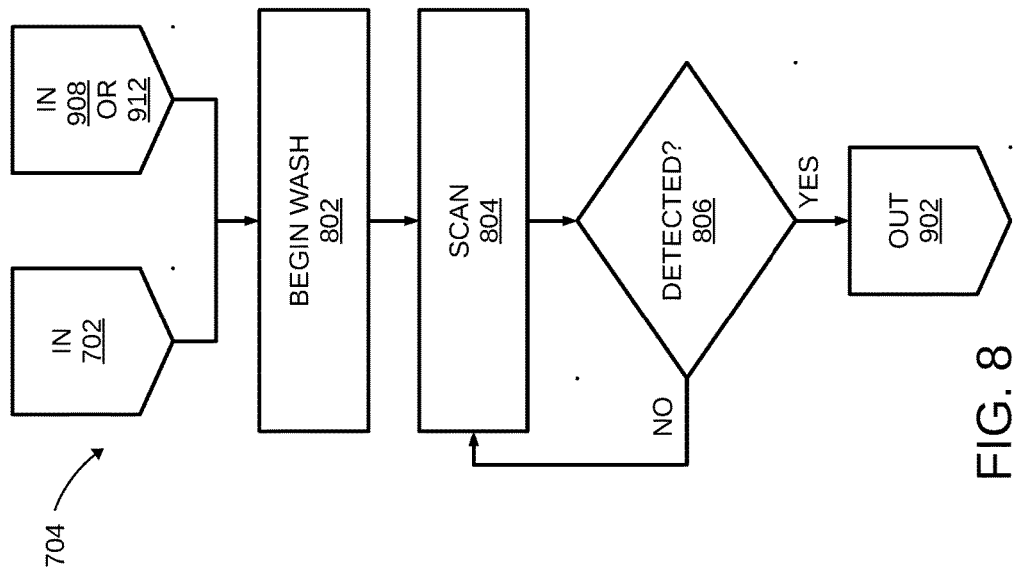
FIG. 8 is a control flow of the detection step of FIG. 7.

Referring now to FIG. 8, therein is shown a control flow of the detection step 704 of FIG. 7. The detection step 704 can be initiated by a begin wash step 802 once the active user 306 of FIG. 3 approaches the station 200 of FIG. 2 in the initialize step 702 of FIG. 7.

In the begin wash step 802, the active user 306 can use soap and water and wash in a sink. The begin wash step 802 can also display the instructions 602 of FIG. 6 on the station user interface 210 of FIG. 2 instructing the active user 306 to begin washing.

The begin wash step 802 can trigger the station 200 to initiate a scan step 804. The scan step 804 can utilize the station sensor unit 208 of FIG. 2 to scan for motions or presence of the active user 306.

The scan step 804 can produce the station sensor data 224 of FIG. 2, which can be analyzed to determine whether the active user 306 is performing a hand washing motion in a detection decision step 806. The scan step 804 can also utilize the station communication unit 206 of FIG. 2 to scan for the signals 308 of FIG. 3 transmitted by the beacons 100 of FIG. 1.

The scan step 804 can send the station sensor data 224 to the detection decision step 806 triggering the detection decision step 806. If the detection decision step 806 determines that the active user 306 is not performing a hand washing motion, then the scan step 804 will be triggered again and the station 200 will attempt to detect the station sensor data 224 that will indicate that the active user 306 is performing a hand washing motion.

If the detection decision step 806 determines that the active user 306 is performing a hand washing motion, then the station 200 will initiate the process step 706 of FIG. 7.

Figure 9:
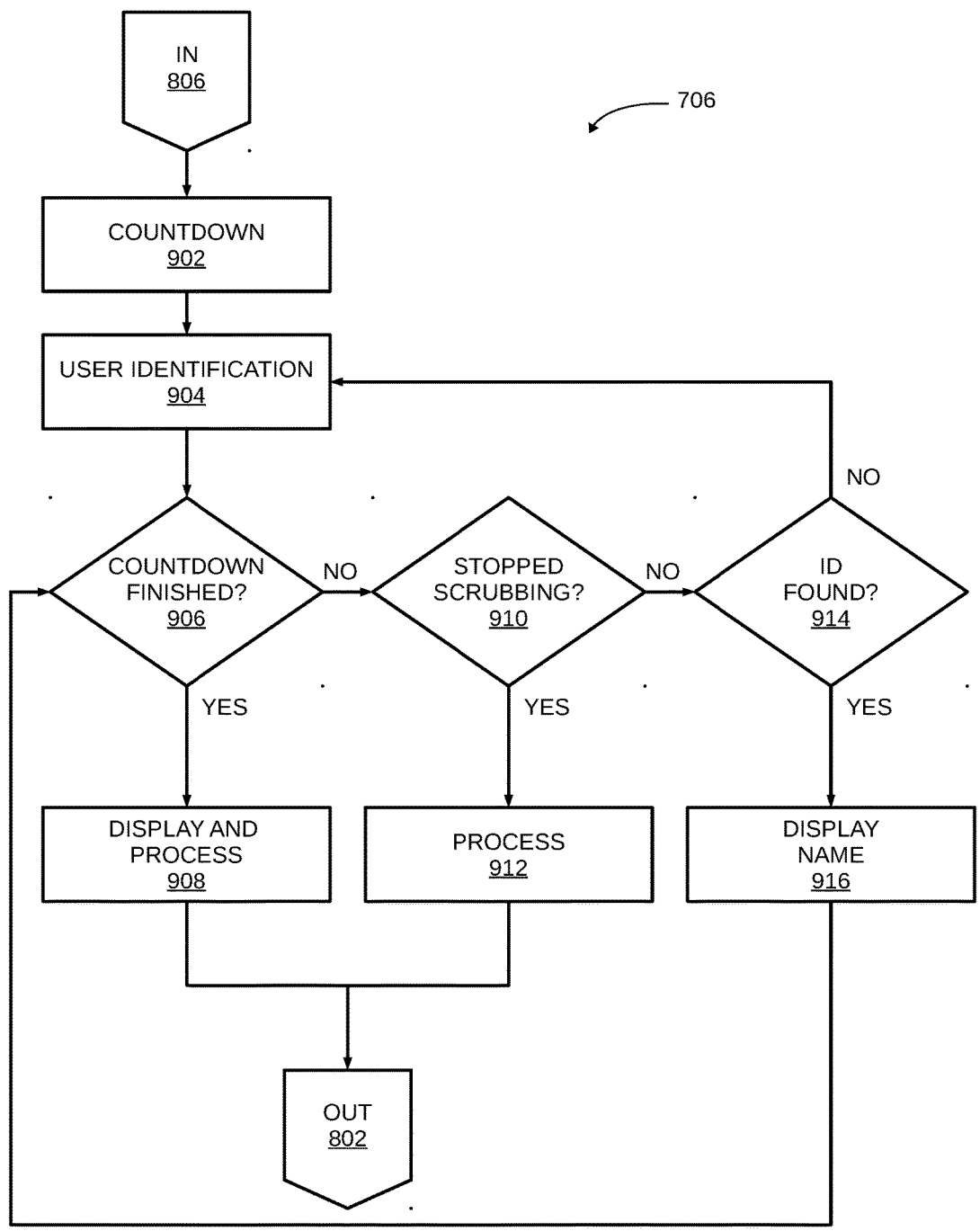
FIG. 9 is a control flow of the process step of FIG. 7.

Referring now to FIG. 9, therein is shown a control flow of the process step 706 of FIG. 7. The process step 706 can begin with a countdown step 902 which can begin once the process step 706 detects a hand washing motion of the active user 306 of FIG. 3.

The countdown step 902 can initialize the station counter 212 of FIG. 2 for the station 200 of FIG. 2. The countdown step 902 can set the station counter 212 to the minimum time required for a compliant hand wash. Illustratively, this could be 30 seconds.

The countdown step 902 will also begin the counting down using the station counter 212 and can display the remaining time on the station user interface 210 of FIG. 2 to the active user 306. The countdown step 902 can update the station user interface 210 with a current countdown from the station counter 212.

Along with displaying the remaining time on the station user interface 210, the station 200 can also display a score of hand wash compliance, a game, a progress bar, or a combination thereof. Once the countdown of the station counter 212 is begun in the countdown step 902, the station 200 can initiate a user identification step 904.

The user identification step 904 can implement the user disambiguation block 310 of FIG. 3 to determine the current user 314 and to correlate the current user 314 with the user ID 116 of FIG. 1 and the user names 220 of FIG. 2. During the user identification step 904, the station 200 can correlate the station sensor data 224 of FIG. 2 with the beacon sensor data 122 of FIG. 1, analyze the RSSI 222 of FIG. 2, and update the Match_List 218 of FIG. 2 to determine which of the users 302 is the most likely candidate for the current user 314.

The station 200 can initiate a countdown decision step 906. If the countdown decision step 906 determines that the countdown of the station counter 212 has completed, the station 200 can implement a display and process step 908.

The display and process step 908 can process the station sensor data 224 and isolate the motions of the active user 306 that result from hand washing motions. The display and process step 908 can process this station sensor data 224 and determine the level of hand washing compliance for the active user 306.

The display and process step 908 can update the station user interface 210 indicating to the active user 306 that the hand washing is complete. During the display and process step 908, the station user interface 210 can display a final score and the total number of scrubs along with a reward screen.

Once the display and process step 908 has processed the motions of the active user 306 for hand washing compliance, the station 200 can upload the results of the compliance to the history record 318 of FIG. 3. The station 200 can then proceed to the begin wash step 802 of FIG. 8 for detecting whether another one of the users 302 of FIG. 3 is beginning to engage with the station 200.

If the countdown decision step 906 determines that the countdown of the station counter 212 has not finished, the station 200 can initiate a scrubbing decision step 910. The scrubbing decision step 910 can determine whether the active user 306 is continuing to wash or whether the active user 306 has stopped washing. If the scrubbing decision step 910 determines that the active user 306 has stopped washing, a process step 912 can be initiated by the station 200 to analyze the station sensor data 224 for scrubbing motions.

The process step 912 can process the station sensor data 224 and isolate the motions of the active user 306 that result from hand washing motions. The process step 912 can process this station sensor data 224 and determine the level of hand washing compliance for the active user 306.

Once the process step 912 has processed the motions of the active user 306 for hand washing compliance, the station 200 can upload the results of the compliance to the history record 318. The station 200 can then proceed to the begin wash step 802 for detecting whether another one of the users 302 is beginning to engage with the station 200.

If the scrubbing decision step 910 determines that the active user 306 is continuing to wash, the station 200 can initiate an ID decision step 914. If the ID decision step 914 determines that the user disambiguation block 310 from the user identification step 904 has identified the user ID 116 of the active user 306 that is valid from the user ID table 216 of FIG. 2, the station 200 can initiate a display name step 916.

The display name step 916 can display the user name 220 of the active user 306 on the station user interface 210. Further, the display name step 916 can also display previous performance or hand washing compliance records for the active user 306.

Once the display name step 916 displays the information for the active user 306 on the station user interface 210, the station 200 can again trigger the countdown decision step 906. If the ID decision step 914 determines that the user disambiguation block 310 has not yet been able to identify the current user 314, then the station 200 will again initiate the user identification step 904.

Figure 10:
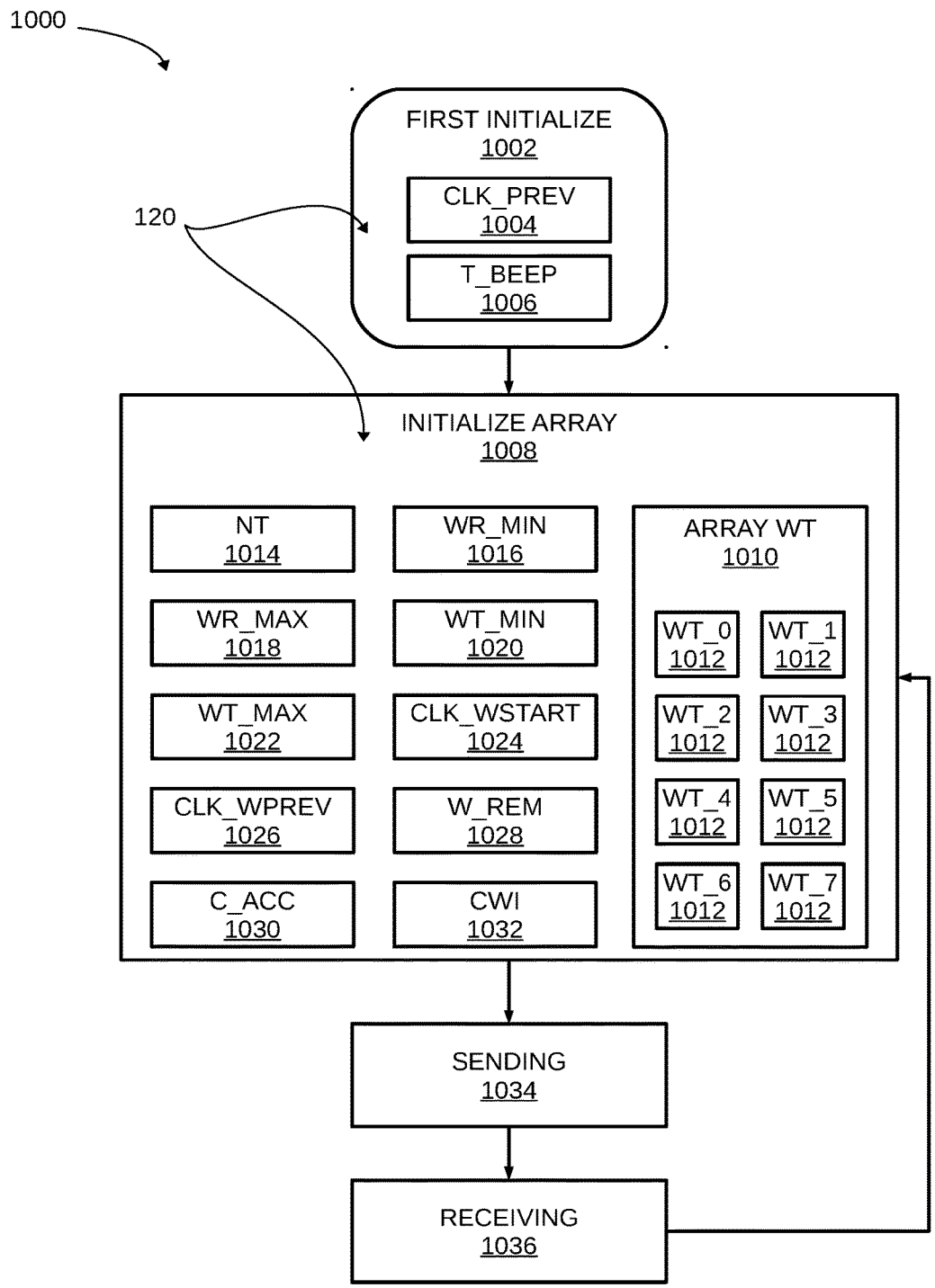
FIG. 10 is a communication control flow for the user identification step of FIG. 9.

Referring now to FIG. 10, therein is shown a communication control flow 1000 for the user identification step 904 of FIG. 9. The communication control flow 1000 can illustrate the process by which the station 200 of FIG. 2 and the beacons 100 of FIG. 1 communicate during the user identification step 904.

It is contemplated that the steps of the communication control flow 1000 can be executed by the beacon control unit 102 of FIG. 1 for each of the beacons 100 and that the beacons 100 can store and set values of the beacon parameters 120 in the beacon storage unit 104 of FIG. 1. It is contemplated that the station communication unit 206 of FIG. 2 can communicate with the beacons 100 and provide instructions for the beacons 100 that will be executed by the beacon control unit 102 of the beacons 100.

Additionally it is contemplated that the beacons 100 could execute the communication control flow 1000 independently of communication from the station 200. The communication control flow 1000 can begin with a beacon initialization step 1002. The beacon initialization step 1002 can initialize the beacons 100 for the first time or when the beacons 100 are first powered on.

The beacon initialization step 1002 can set the beacon parameters 120. For example, the beacon initialization step 1002 can set the beacon parameter 120, CLK_PREV 1004, to the current time. The beacon initialization step 1002 can further set the beacon parameter 120, T_BEEP 1006, to a previous time, such as zero when using Coordinated Universal Time (UTC). It is contemplated that T_BEEP 1006 can be set to a time in the distant past.

The T_BEEP 1006 is the time at which the beacon user interface 110 of FIG. 1 will emit an audio or visual queue such as a beep. Setting the T_BEEP 1006 to a previous time ensures that the beacon 100 will not emit the audio or visual queue.

The communication control flow 1000 can proceed from the beacon initialization step 1002 to an array initialization step 1008. During the array initialization step 1008, the station 200 can instruct the beacons 100 to create a wait time interval array 1010 and set the beacon parameters 120 other than the CLK_PREV 1004 and the T_BEEP 1006.

The wait time interval array 1010 can include wait times 1012. The wait time interval array 1010 is depicted having wait times 1012 one through eight. The wait times 1012 can be an amount of time that the beacon 100 waits before various procedures.

The wait times 1012 can be stored in the beacon storage unit 104 and measured using the beacon counter 112 of FIG. 1 in the beacon control unit 102. The wait times 1012 can be generated in compliance with beacon parameters 120 set prior to the creation of the wait time interval array 1010.

It is contemplated that the beacon parameter 120, NT 1014, can be set within the beacon 100 and can specify the total number of the wait times 1012 within the wait time interval array 1010. Further beacon parameters 120, WR_MIN 1016 and WR_MAX 1018, can be set within the beacon 100 and provide an upper and lower bounds for the first wait time 1012 depicted as WT_0 in the wait time interval array 1010 and the last wait time 1012 depicted as WT_7 in the wait time interval array 1010.

The first and the last wait times 1012 within the wait time interval array 1010 can be the length of time that the beacon 100 waits after transmitting the signal 308 of FIG. 3 before initiating a receive window during which time the beacon communication unit 106 of FIG. 1 can receive the signal 308 from the station 200.

It is contemplated that the first and last wait times 1012 can be randomly generated by the beacon control unit 102 and stored within the beacon storage unit 104. The first and last wait times 1012 can be randomly generated to provide a length of time between the WR_MIN 1016 and WR_MAX 1018.

Illustratively, if WR_MIN 1016 is set to one second and WR_MAX 1018 is set to two seconds, then the beacon control unit 102 might generate the first and last wait times 1012 of 1.4 seconds and 1.2 seconds. Further beacon parameters 120, WT_MIN 1020 and WT_MAX 1022, can be set within the beacon 100 and provide an upper and lower bounds for the middle wait times 1012 between the first and last wait times 1012.

The middle wait times 1012 are depicted as WT_1, WT_2, WT_3, WT_4, WT_5, and WT_6 in the wait time interval array 1010. The middle wait times 1012 within the wait time interval array 1010 can be the length of time the beacon 100 waits between the transmissions of the signal 308 from the beacon communication unit 106 to the station 200.

It is contemplated that the middle wait times 1012 can be randomly generated by the beacon control unit 102 and stored within the beacon storage unit 104. The middle wait times 1012 can be randomly generated to provide a length of time between the WT_MIN 1020 and WT_MAX 1022.

Illustratively, if WT_MIN 1020 is set to one second and WT_MAX 1022 is set to two seconds, then the beacon control unit 102 might generate the middle wait times 1012 of 1.3 seconds, 1.9 seconds, etc.

During the array initialization step 1008, the beacon 100 can also set the beacon parameter 120 CLK_WSTART 1024 to the current time. The CLK_WSTART 1024 can be the time at which the beacon 100 started processing a newly generated wait time interval array 1010 of wait times 1012.

During the array initialization step 1008, the beacon 100 can also set the beacon parameter 120 CLK_WPREV 1026 to the CLK_WSTART 1024. The CLK_WPREV 1026 can be the time that the beacon 100 started the current wait.

During the array initialization step 1008, the beacon 100 can also set the beacon parameter 120 W_REM 1028 to the sum of all the wait times 1012. During the array initialization step 1008 the beacon 100 can also set the beacon parameter 120 C_ACC 1030 to zero.

The C_ACC 1030 can be the total time that has elapsed since the beacon 100 started processing the current wait time interval array 1010 of wait times 1012. During the array initialization step 1008, the beacon 100 can also set the beacon parameter 120 CWI 1032 to zero.

The CWI 1032 can point to one of the wait times 1012 in the wait time interval array 1010 that the beacon 100 is currently processing and waiting for. The CWI 1032 can be incremented to index through the wait times 1012.

For example, when the CWI 1032 is set to zero in the array initialization step 1008, the beacon 100 will be indexed to process and wait according to WT_0. As the CWI 1032 is incremented, the beacon 100 will index to a different wait time 1012. For example, when the CWI 1032 is incremented to one, the beacon 100 will index to WT_1, when the CWI 1032 is incremented to two the beacon 100 will index to WT_2, and when the CWI 1032 is incremented to NT 1014, the beacon 100 will index to WT_NT, which is illustratively depicted as WT_7.

The communication control flow 1000 can proceed from the array initialization step 1008 to a sending step 1034. During the sending step 1034, the beacons 100 can activate and prepare messages that can be broadcast in the signal 308 with the beacon communication unit 106 to the station 200.

The communication control flow 1000 can proceed from the sending step 1034 to a receiving step 1036. During the receiving step 1036, the beacons 100 can receive and process messages broadcast in the signal 308 from the station 200. Once the receiving step 1036 is complete, the beacon 100 can proceed back to the array initialization step 1008.

Figure 11:
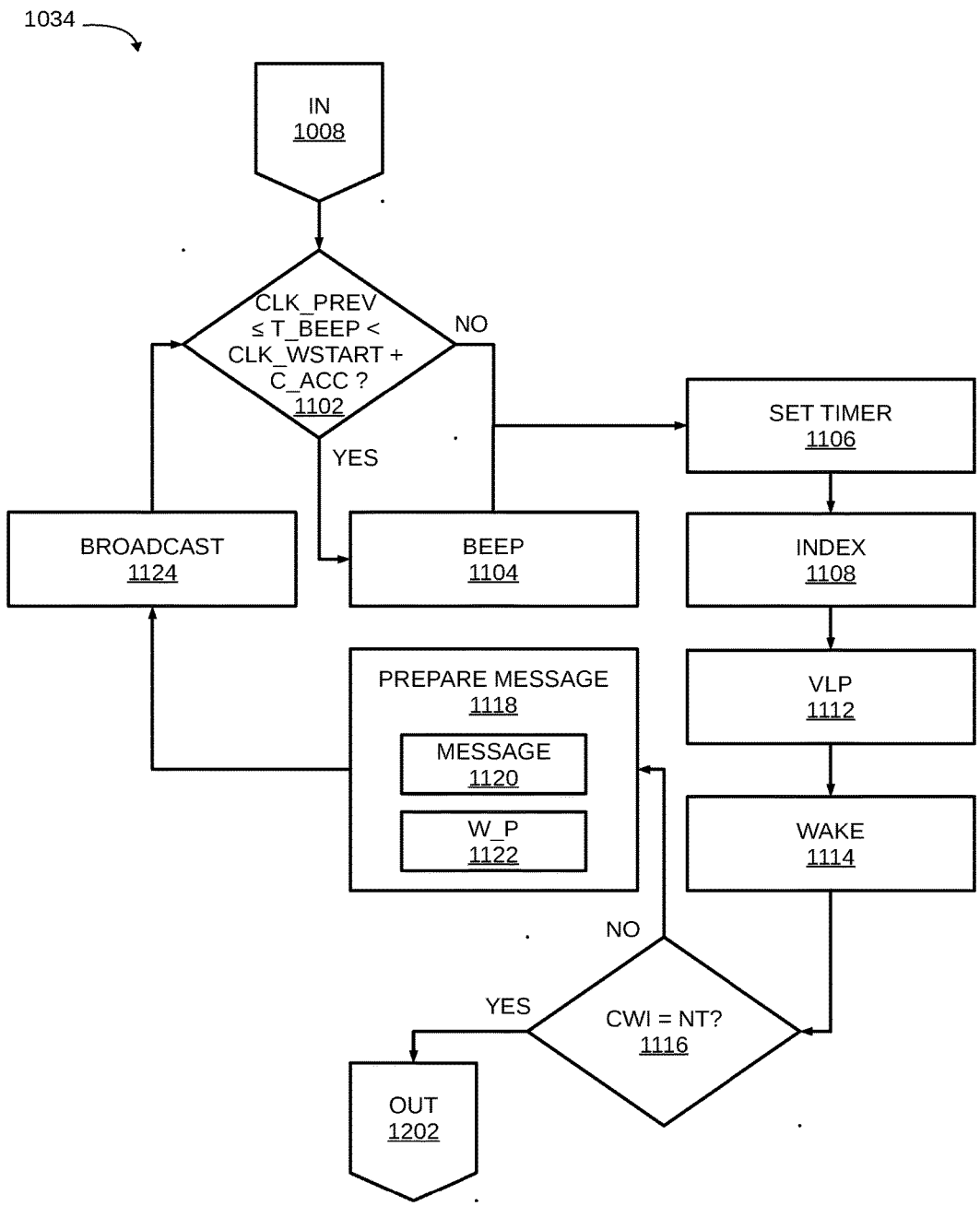
FIG. 11 is a control flow of the sending step of FIG. 10.

Referring now to FIG. 11, therein is shown a control flow of the sending step 1034 of FIG. 10. The sending step 1034 can begin with an elapsed time decision step 1102. The elapsed time decision step 1102 can follow the array initialization step 1008 of FIG. 10.

The elapsed time decision step 1102 can compare the beacon parameters 120: CLK_PREV 1004 of FIG. 10, CLK_WSTART 1024 of FIG. 10, and C_ACC 1030 of FIG. 10 to T_BEEP 1006 of FIG. 10. Specifically, the elapsed time decision step 1102 checks to determine whether CLK_PREV 1004 is less or equal to T_BEEP 1006.

If CLK_PREV 1004 is greater than T_BEEP 1006, this indicates that the previous time the beacon 100 of FIG. 1 executed elapsed time decision step 1102 was after T_BEEP 1006 was set to go off. If CLK_PREV 1004 is less than or equal to T_BEEP 1006, this indicates that the previous time the beacon 100 executed the elapsed time decision step 1102 was before T_BEEP 1006 is set to go off.

If CLK_WSTART 1024+C_ACC 1030 is greater than T_BEEP 1006, this indicates that the current time the beacon 100 is executing the elapsed time decision step 1102 is after the T_BEEP 1006 was set to go off. If CLK_WSTART 1024+C_ACC 1030 is less than or equal to T_BEEP 1006, this indicates that the current time the beacon 100 is executing the elapsed time decision step 1102 is before the T_BEEP 1006 is set to go off.

The result of the elapsed time decision step 1102 will be to determine whether the previous execution was before or at the same time as T_BEEP 1006 and the current execution is after T_BEEP 1006. When this is the case the beacon 100 will execute a beep step 1104. The beep step 1104 can trigger the beacon user interface 110 of FIG. 1 to provide an audio or visual indicator to the user 302 of FIG. 3.

The beep step 1104 can also set CLK_PREV 1004 to CLK_WSTART 1024+C_ACC 1030. Setting CLK_PREV 1004 to CLK_WSTART 1024+C_ACC 1030 updates CLK_PREV 1004 to the time the beep step 1104 is executed providing the elapsed time decision step 1102 an updated CLK_PREV 1004 for comparison in a subsequent execution of the elapsed time decision step 1102.

When the elapsed time decision step 1102 determines that the previous execution of the elapsed time decision step 1102 was not before or at the same time as T_BEEP 1006 or the current execution is not after T_BEEP 1006, the beacon 100 will execute a timer set step 1106 and will not execute beep step 1104.

It will be appreciated that when T_BEEP 1006 is set to a past time in the beacon initialization step 1002 of FIG. 10, the elapsed time decision step 1102 will determine that the previous execution of the elapsed time decision step 1102 was not before or was not at the same time as T_BEEP 1006, which can prevent the beacon 100 from executing the beep step 1104.

The beacon 100 can proceed from the elapsed time decision step 1102 to the timer set step 1106 when the result of elapsed time decision step 1102 is negative, and the beacon 100 can proceed from executing the beep step 1104 to executing the timer set step 1106. The timer set step 1106 can set the C_ACC 1030 to C_ACC 1030+WT_[CWI]. That is C_ACC 1030 is set to C_ACC 1030 plus the currently indexed wait time 1012 of FIG. 10.

The timer set step 1106 can subsequently set the beacon counter 112 of FIG. 1 to wake the beacon 100 at a wake time CLK_WSTART 1024+C_ACC 1030. The beacon 100 can proceed from the timer set step 1106 to an index step 1108.

The index step 1108 can set the beacon parameter 120, W_REM 1028 of FIG. 10, to W_REM 1028−WT_[CWI]. That is W_REM 1028 minus the currently indexed wait time 1012, which can be used as an indication of how long until the beacon communication unit 106 of FIG. 1 of the beacon 100 will be ready to receive the signal 308 of FIG. 3 from the station 200 of FIG. 2. The index step 1108 can also increment CWI 1032 for indexing to the next wait time 1012. That is CWI 1032=CWI 1032+1.

Once the beacon 100 executes the index step 1108, the beacon 100 can proceed to enter a low power state in a very-low-power step 1112. The beacon 100 can remain in the low power state until the beacon counter 112 completes the time set in the timer set step 1106.

Once the beacon counter 112 finishes the count set in the timer set step 1106, the beacon 100 can execute a wake step 1114. The wake step 1114 can bring the beacon 100 out of the low power state initiated in the very-low-power step 1112.

After the beacon 100 wakes in the wake step 1114, the beacon 100 can execute an indexing decision step 1116. The indexing decision step 1116 can determine whether CWI 1032=NT 1014 of FIG. 10. That is, whether the current indexed wait time 1012 is the last wait time 1012 of the wait time interval array 1010 of FIG. 10.

When the indexing decision step 1116 determines that CWI 1032 does not equal NT 1014, the last wait time 1012 of the wait time interval array 1010 has not been reached and the beacon 100 can proceed to execute a message preparation step 1118.

During the message preparation step 1118, the beacon 100 can create a message 1120 that can be stored in the beacon storage unit 104 of FIG. 1 for later transmission to the station 200. The message 1120 can include the user ID 116 of FIG. 1 along with the W_REM 1028 set in index step 1108.

Providing the W_REM 1028 in the message 1120 indicates to the station 200 when the beacon 100 will execute the receiving step 1036 of FIG. 10 and thereby be in a listening state ready to receive the signal 308 from the station 200. It is further contemplated that the beacon 100 can insert the beacon sensor data 122 of FIG. 1, such as acceleration forces into the message 1120 if the beacon 100 is currently parametrized to do so.

The beacon 100 can include the beacon parameter 120 W_P 1122. The W_P 1122 can be the power at which the message 1120 is transmitted at.

Once the beacon 100 executes the message preparation step 1118, the beacon 100 can proceed to execute a broadcast step 1124. The broadcast step 1124 can power up the beacon communication unit 106 and broadcast the signal 308 containing the message 1120 at the specified power W_P 1122.

The beacon 100 will proceed from the broadcast step 1124 back to the elapsed time decision step 1102. The beacon 100 will continue to cycle through the sending step 1034 until the indexing decision step 1116 determines that CWI 1032=NT 1014.

That is, until the current indexed wait time 1012 is the last wait time 1012 of the wait time interval array 1010. When the current indexed wait time 1012 is the last wait time 1012 of the wait time interval array 1010, the beacon 100 will proceed to the receiving step 1036.

Figure 12:
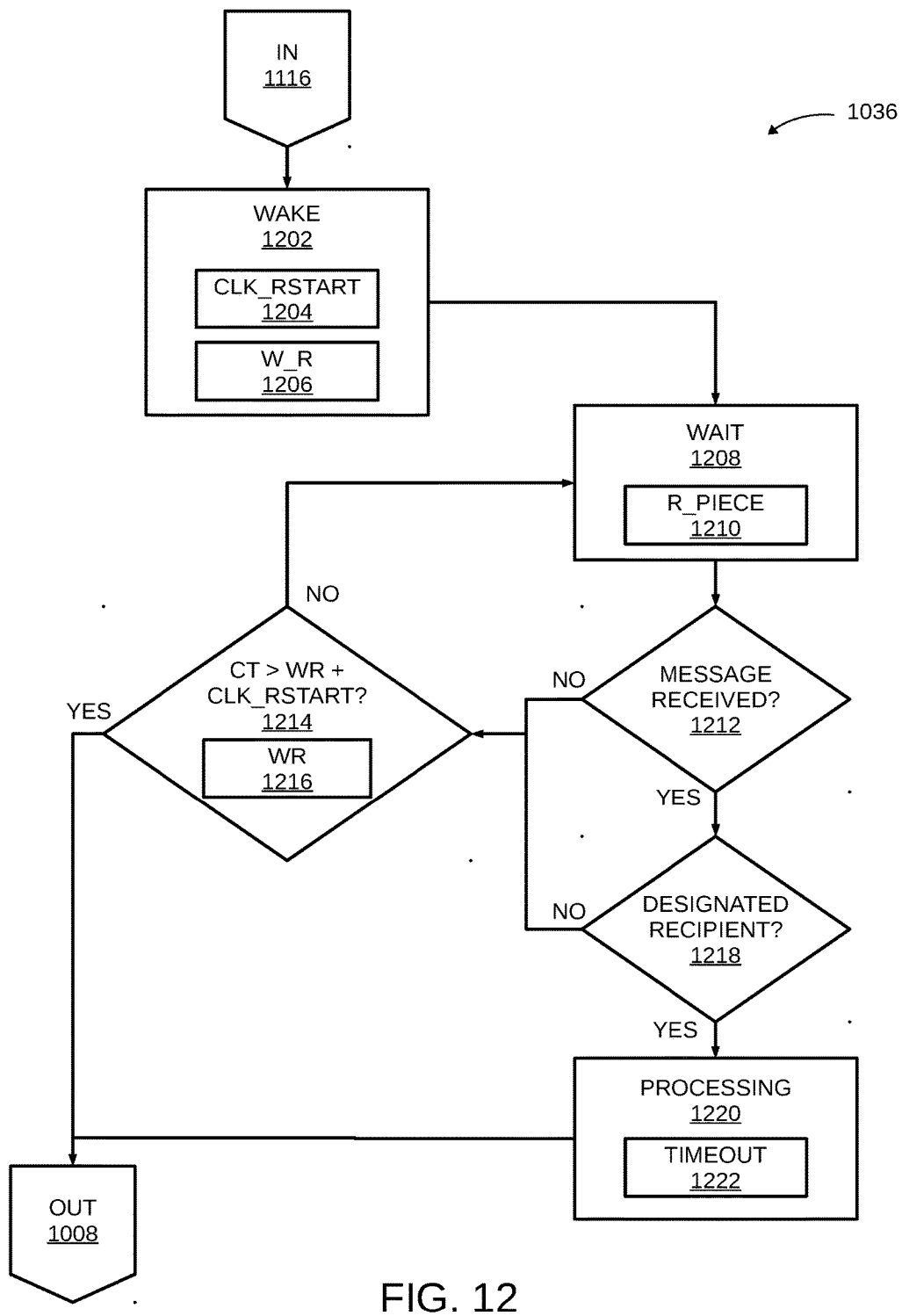
FIG. 12 is a control flow of the receiving step of FIG. 10.

Referring now to FIG. 12, therein is shown a control flow of the receiving step 1036 of FIG. 10. During the receiving step 1036, the beacon 100 of FIG. 1 can wake or activate the beacon communication unit 106 of FIG. 1 to operate in a receive mode in a wake step 1202.

Further, during the wake step 1202, the beacon 100 can set the beacon parameter 120 of FIG. 1, CLK_RSTART 1204, to the current time. The CLK_RSTART 1204 can indicate the time that the beacon communication unit 106 started operating in a receive mode.

Yet further, during the wake step 1202, the beacon 100 can set the beacon parameter 120, W_R 1206. The W_R 1206 can be a short time window, but a time window that is long enough to receive the shortest message 1120 of FIG. 11 being repeated out of phase by the station 200 of FIG. 2.

The beacon counter 112 of FIG. 1 can countdown the W_R 1206 length of time and then proceed to execute a wait step 1208. During the wait step 1208, the beacon 100 can wait for the message 1120 to be received from the station 200.

The wait step 1208 can wait for a length of time R_PIECE 1210. The R_PIECE 1210 can be one of the beacon parameters 120 representing the interval between repetitions of the receiving step 1036. The beacon counter 112 can countdown through the R_PIECE 1210 time length.

Once the beacon 100 completes the R_PIECE 1210 wait time, the beacon 100 can proceed to a message received decision step 1212. The message received decision step 1212 can determine whether the beacon 100 has received the message 1120 from the station 200 during the wait step 1208.

If the message received decision step 1212 determines that the message 1120 has not been received by the beacon 100 during the wait step 1208, the beacon 100 will execute a receive window decision step 1214. The receive window decision step 1214 can determine whether the current time is greater than CLK_RSTART 1204+WR 1216.

The beacon parameter 120, WR 1216, can be a length of time of a listening window for the beacon 100. That is, WR 1216 can be how long the beacon communication unit 106 should operate in the receive mode.

The CLK_RSTART 1204 plus the WR 1216 can be a time that the beacon 100 should be done operating in a receive mode. If the current time is greater than the CLK_RSTART 1204+the WR 1216, the beacon 100 will initiate the array initialization step 1008 of FIG. 10. If the current time is less than or equal to the CLK_RSTART 1204+the WR 1216, the beacon 100 will again execute the wait step 1208.

If the message 1120 is being received by the beacon 100 at the moment the current time reaches CLK_RSTART 1204+the WR 1216 then the beacon 100 may include the function of waiting for the current message 1120 from the station 200 to finish being received before deactivating the receiver in the beacon communication unit 106 of FIG. 1 and checking to see if a the beacon parameters 120 should be modified based on the message 1120. If the message received decision step 1212 determines that the message 1120 has been received by the beacon 100 during the wait step 1208, the beacon 100 will execute a current beacon decision step 1218.

During the current beacon decision step 1218 the beacon 100 can check the message 1120 to determine whether the station 200 has designated the beacon 100 by including the user ID 116 of FIG. 1 of the beacon 100 in the message 1120.

If the message 1120 from the station 200 does not include the user ID 116 designating the beacon 100, the beacon 100 will again execute the receive window decision step 1214. If the message 1120 from the station 200 does include the user ID 116 designating the beacon 100, the beacon 100 will execute a processing step 1220.

During the processing step 1220, the beacon 100 will process the message 1120 from the station 200 received during the wait step 1208. The message 1120 from the station 200 can update the beacon parameters 120.

For example, the message 1120 could require the beacon 100 to send specific beacon sensor data 122 of FIG. 1 such as acceleration forces detected by the beacon sensor unit 108 of FIG. 1. In such a case the beacon 100 could power up the beacon sensor unit 108 to detect acceleration forces to be transmitted to the station 200 during the sending step 1034 of FIG. 10.

During the processing step 1220, the station 200 can modify the beacon parameters 120 controlling the length of the beacon's 100 listening window, controlling how frequently and strongly the beacon 100 broadcasts the message 1120 to the station 200, and controlling how frequently the beacon 100 operates with the beacon communication unit 106 activates the listening window.

It is contemplated that the beacon 100 can have a parameter timeout 1222. When the parameter timeout 1222 is triggered the beacon 100 can switch back to previously saved beacon parameters 120.

It is contemplated that implementing the parameter timeout 1222 allows previously saved beacon parameters 120 to be reverted. The previously saved beacon parameters 120 can include the beacon parameters 120 controlling frequencies, wait times, transmission strengths, and which portions of the beacon 100 should be operated such as the beacon sensor unit 108, the beacon storage unit 104 of FIG. 1, or the beacon communication unit 106. Once the beacon 100 executes the processing step 1220, the beacon 100 can again execute the array initialization step 1008.

Figure 13:
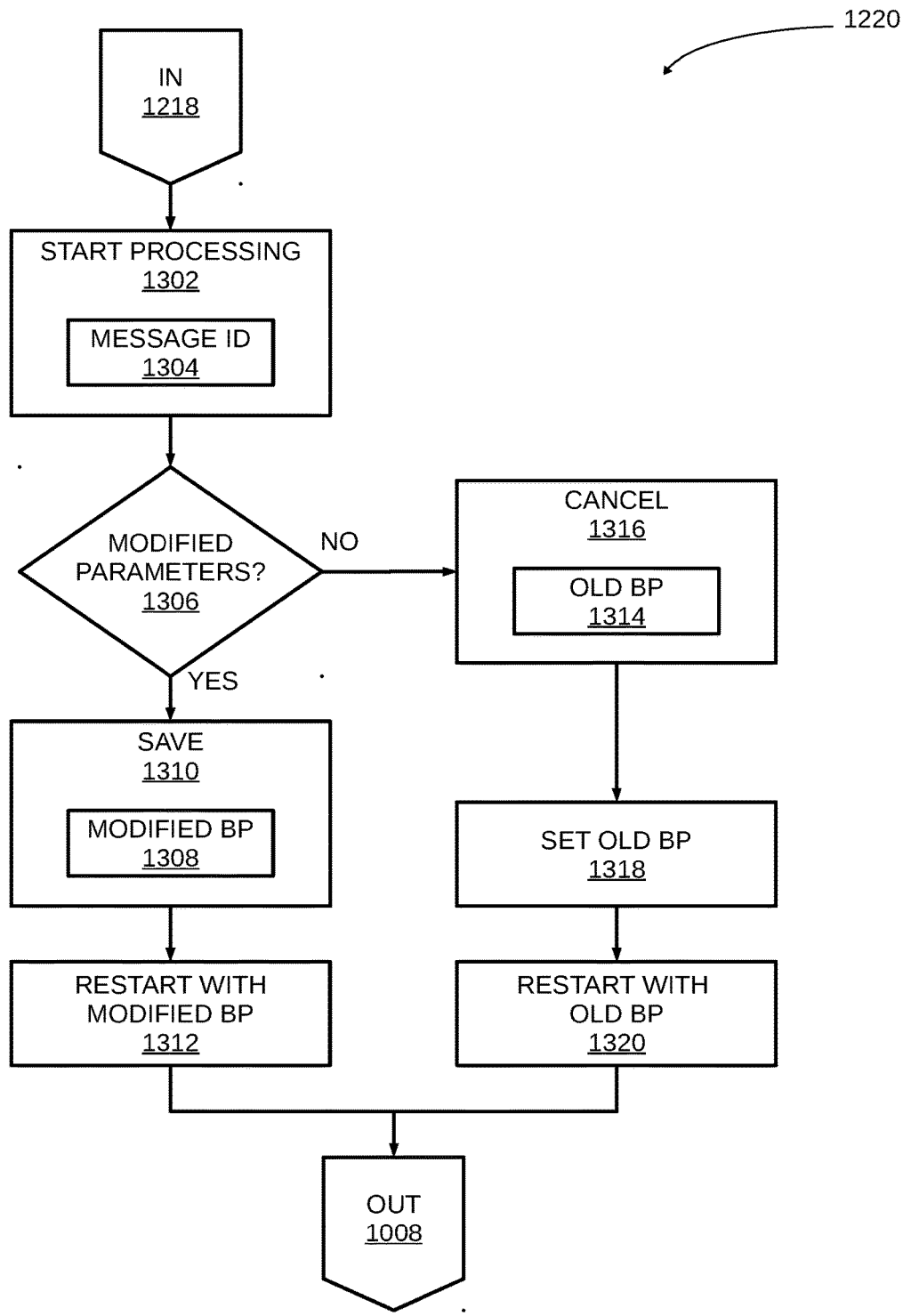
FIG. 13 is a control flow of the processing step of FIG. 12.

Referring now to FIG. 13, therein is shown a control flow of the processing step 1220 of FIG. 12. The processing step 1220 depicts the steps by which the beacon parameters 120 of FIG. 1 for the beacon 100 of FIG. 1 are updated.

The beacon parameters 120 may control the frequency with which the beacon 100 broadcasts. For example, the beacon 100 could transmit the signal 308 of FIG. 3 containing the message 1120 of FIG. 11 with the beacon communication unit 106 of FIG. 1 once per second, ten times per second, or once per minute.

The beacon parameters 120 may also control the power with which the beacon 100 broadcasts. For example, the beacon 100 could broadcast the signal 308 containing the message 1120 with the beacon communication unit 106 with a specific milliwatt in decibels.

The beacon parameters 120 may also control how frequently with which the beacon 100 provides the listening window of the wait step 1208 of FIG. 12. For example, the beacon 100 could execute a listening window by waiting for the R_PIECE 1210 of FIG. 12 in the wait step 1208 once for every ten times the beacon 100 broadcasts while executing the broadcast step 1124 of FIG. 11.

The beacon parameters 120 may also control the length of time with which the beacon 100 provides the listening window of the wait step 1208. For example, the beacon 100 could execute a listening window by waiting for the R_PIECE 1210 in the wait step 1208 for 1 millisecond, 100 microseconds, or 1 second.

It has been discovered that a random arrangement in time of broadcast and listening windows helps reduce the chances that multiple beacons 100 will repeatedly broadcast the signal 308 to the station 200 of FIG. 2 at the same time or will repeatedly listen for the signal 308 from the station 200 at the same time. It is contemplated that the beacon parameters 120 can include minimum and maximum lengths of time between broadcasts or listening windows and that the beacon 100 itself may assign an actual amount of time as a random number taken between these two limits.

Illustratively, as previously set forth, the station 200 can include the WT_MIN 1020 of FIG. 10 and the WT_MAX 1022 of FIG. 10 in the message 1120 sent to the beacons 100. The WT_MIN 1020 and the WT_MAX 1022 can be lower and upper bounds, respectively.

Further, the WT_MIN 1020 and the WT_MAX 1022 can be used by the beacon 100 to randomly set the wait times 1012 of FIG. 10 between the broadcasts in the broadcast step 1124. It is contemplated that the station 200 could further provide other minimum and maximum beacon parameters 120 that the beacons 100 could utilize to randomly generate a random arrangement in time of the broadcast and listening windows.

It is contemplated that the station 200 could send minimum and maximum beacon parameters 120 that the beacon 100 could use to randomly generate times between listening windows during the receiving step 1036 of FIG. 10. It is further contemplated that the station 200 could send minimum and maximum beacon parameters 120 that the beacon 100 could use to randomly generate the length of listening windows during the receiving step 1036.

These minimum and maximum beacon parameters 120 could be set to the same value, which would indicate a constant length for the listening window without randomness. It is contemplated that the minimum and maximum beacon parameters 120 of the message 1120 could be the same for some of the beacon parameters 120 as a default, in which case, two separate values for the beacon parameters 120 could indicate a special case when randomness is requested by the station 200. The default of identical lengths can decrease the typical size of the message 1120 that is communicated by the station 200 with the beacon parameters 120.

It is further contemplated that the station 200 could send minimum and maximum beacon parameters 120 that the beacon 100 could use to randomly generate the length of transmission windows during the broadcast step 1124. These minimum and maximum beacon parameters 120 could be set to the same value, which would indicate a constant length for the listening window without randomness.

It is contemplated that the minimum and maximum beacon parameters 120 of the message 1120 could be the same for some of the beacon parameters 120 as a default, in which case, two separate values for the beacon parameters 120 could indicate a special case when randomness is requested by the station 200. The default of identical lengths can decrease the typical size of the message 1120 that is communicated by the station 200 with the beacon parameters 120. It is contemplated that the station 200 could broadcast the message 1120 containing the beacon parameters 120 repeatedly.

It has been discovered that repeatedly transmitting the message 1120 in the signal 308 by the station 200 can ensure that the beacons 100 will be able to receive the message 1120 once the randomly generated listening window for the beacon 100 is activated during the wait step 1208. It has further been discovered that repeatedly transmitting the message 1120 in the signal 308 from the station 200 to the beacons 100 implementing randomized receive windows enables accurate communication between the station 200 and the beacons 100 even when communication latencies resulting with the station 200 not knowing the exact moment when the listening window for the beacon 100 begins, such as accuracy to the millisecond but not microsecond due to out-of-synch clocks between the beacon 100 and the station 200.

The processing step 1220 is depicted having a start processing step 1302. The start processing step 1302 can be initiated and executed by the beacon 100 after an affirmative result from the current beacon decision step 1218 of FIG. 12.

The start processing step 1302 can be executed during the beacon's 100 listening window during the receiving step 1036. During the start processing step 1302 the beacon 100 can store the message 1120 using the beacon storage unit 104 of FIG. 1, can decode the message 1120 from the signal 308 using the beacon control unit 102 of FIG. 1, or can isolate portions of the message 1120 and de-noise the message 1120 using the beacon control unit 102.

It is contemplated that the start processing step 1302 could include the current beacon decision step 1218. It is further contemplated that the current beacon decision step 1218 could be performed initially or in a different order. It is yet further contemplated it is contemplated that the station 200 could encrypt or digitally sign the message 1120 so that the station 200 can be identified by the beacon 100.

The beacon 100 could decrypt or verify the digital signature of the station 200 during the start processing step 1302. It is further contemplated that the station 200 could include a message ID 1304 within the message 1120 sent from the station 200 to the beacon 100.

It has been discovered that including the message ID 1304 in the message 1120 can allow the station 200 to repeatedly broadcast the similar messages 1120 with identical instructions for the beacon 100 to modify or not modify the beacon parameters 120 and can be used by the beacon 100 to prevent the beacon 100 from acting on the same message 1120 multiple times even when the same message 1120 is received by the beacon 100 multiple times. The beacon 100 can execute a modified parameters decision step 1306 once the start processing step 1302 is complete.

The modified parameters decision step 1306 can determine whether the message 1120 from the station 200 instructs the beacon 100 to modify the beacon parameters 120 with modified beacon parameters 1308. If the message 1120 from the station 200 indicates that the beacon 100 should use the modified beacon parameters 1308, then the beacon 100 executes a save modified parameter step 1310.

During the save modified parameter step 1310, the beacon 100 can save the modified beacon parameters 1308 contained in the message 1120 received by the beacon 100 from the station 200 during the receiving step 1036. The new beacon parameters 120 can be saved in the beacon storage unit 104 and utilized by the beacon 100.

It is contemplated that the message 1120 could additionally contain a data payload and the beacon state 114 of FIG. 1, which the can prompt the beacon control unit 102 to change the beacon state 114 of the beacon 100 in order to process the data payload. Prompting the beacon 100 to process the data payload can require the beacon 100 to process the data payload before initiating a modified restart step 1312.

Alternatively, after the modified beacon parameters 1308 are saved in the save modified parameter step 1310 the beacon 100 can execute the modified restart step 1312. The modified restart step 1312 can restart the beacon 100 with the modified beacon parameters 1308 and specifically the beacon 100 can proceed to execute the array initialization step 1008 of FIG. 10 utilizing the modified beacon parameters 1308.

If the message 1120 from the station 200 indicates that the beacon 100 should use old beacon parameters 1314, then the beacon 100 executes a cancel modified parameter step 1316. During the cancel modified parameter step 1316 the beacon 100 can cancel the use of the modified beacon parameters 1308.

The beacon 100 can proceed from the cancel modified parameter step 1316 to a set old parameters step 1318. The set old parameters step 1318 can set the beacon parameters 120 to the old beacon parameters 1314.

For example the modified beacon parameters 1308 that the beacon 100 could have saved during a previous execution of the save modified parameter step 1310, can be replaced by the old beacon parameters 1314 so that the modified beacon parameters 1308 are no longer used by the beacon 100. It is contemplated that the station 200 could send the message 1120 indicating that the modified beacon parameters 1308 should no longer be used when the result of the user disambiguation block 310 of FIG. 3 indicates that the beacon 100 does not belong to the active user 306 of FIG. 3.

When the user disambiguation block 310 of the station 200 determines that any of the beacons 100 belong to the inactive users 304 of FIG. 3 rather than the active user 306, all of the beacons 100 belonging to the inactive users 304 can revert to the old beacon parameters 1314. It has been discovered that reverting to the old beacon parameters 1314 for the beacons 100 coupled to the inactive users 304 can significantly reduce the power consumed by the beacons 100.

It has been discovered that the modified beacon parameters 1308 can significantly aid in determining which of the beacons 100 belongs to the active user 306 but at the expense of using more power. For example disambiguation accuracy improves and beacon power consumption increases if the modified beacon parameters 1308 are utilized to change the power at which the signal 308 is broadcast from the beacon 100 from −10 decibel-milliwatts (dBm) to 4 dBm, or if the modified beacon parameters 1308 are utilized to change the frequency at which the signal 308 is broadcast from the beacon 100 from 1 Hz to 10 Hz.

It has been discovered that by utilizing the old beacon parameters 1314, which reduce the power consumption of the beacon 100 when disambiguation is not needed, the power consumption cost of falsely identifying the beacons 100 as candidates for the current user 314 of FIG. 3 is minimized. Once the beacon 100 sets the old beacon parameters 1314 in the set old parameters step 1318 the beacon 100 can execute an old restart step 1320.

The old restart step 1320 can restart the beacon 100 with the old beacon parameters 1314 and proceed to the array initialization step 1008 utilizing the old beacon parameters 1314. The old beacon parameters 1314 can allow the beacon 100 to return to less frequent operation of the listening window, less frequent broadcast, and less powerful broadcast.

The old beacon parameters 1314 can also indicate that the beacon 100 should no longer activate the beacon sensor unit 108 of FIG. 1 to generate the beacon sensor data 122 of FIG. 1 or to include the beacon sensor data 122 in the message 1120 broadcast from the beacon 100. The old beacon parameters 1314 can place the beacon sensor unit 108 into a low power or inactive state.

Figure 14:
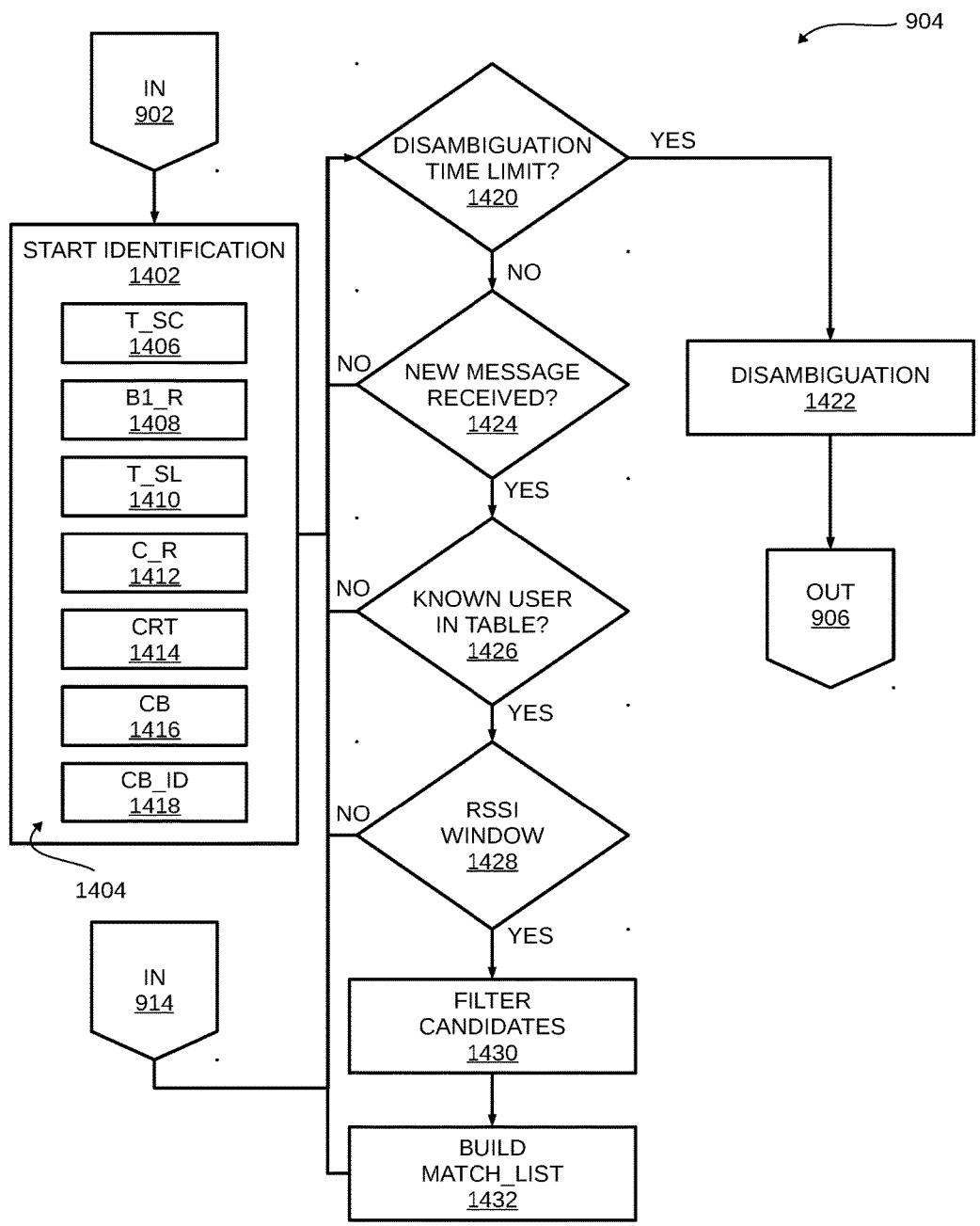
FIG. 14 is a control flow of the user identification step of FIG. 9.

Referring now to FIG. 14, therein is shown a control flow of the user identification step 904 of FIG. 9. The user identification step 904 can be an illustrative embodiment of how the station 200 of FIG. 2 identifies the current user 314 of FIG. 3 as the active user 306 of FIG. 3 and distinguishes the active user 306 from the inactive users 304 of FIG. 3. The user identification step 904 can implement the communication control flow 1000 of FIG. 10 to control and direct the communications between the station 200 and the beacons 100 of FIG. 1.

The user identification step 904 is depicted having a start identification step 1402. The start identification step 1402 sets station parameters 1404. The station parameters 1404 can be variables set by the station control unit 202 of FIG. 2 and stored in the station storage unit 204 of FIG. 2.

The start identification step 1402 sets one of the station parameters 1404, T_SC 1406, to zero. The T_SC 1406 can be the current amount of time that has elapsed since the active user 306 began interacting with the station 200 such as in the begin wash step 802 of FIG. 8. The start identification step 1402 can further set the station parameter 1404, B1_R 1408.

The B1_R 1408 can be the best RSSI 222 of FIG. 2 of the signals 308 of FIG. 3 sent from the beacons 100 that the station 200 has received so far during the active user's 306 interaction with the station 200. The B1_R 1408 can be set to a very low number.

It is contemplated that the B1_R 1408 should be set to a number that is lower than any expected RSSI 222 from a beacon 100 near the station 200. For example, the B1_R 1408 can be set to −300 dBm. This can ensure that any RSSI 222 received from the beacons 100 will be higher than B1_R 1408.

The start identification step 1402 can further set the Match_List 218 of FIG. 2 to empty. This can clear the Match_List 218 and enable a new Match_List 218 to be built from the users 302 of FIG. 3 near to the station 200.

It is contemplated that the start identification step 1402 can clear, set, or store other station parameters 1404 such as a T_SL 1410, a C_R 1412, a CRT 1414, a CB 1416 and a CB_ID 1418. Alternatively, it is contemplated that the station parameters 1404: T_SL 1410, C_R 1412, CRT 1414, CB 1416, and CB_ID 1418 can be set to previously used values and can be overwritten during different steps of the user identification step 904.

The T_SL 1410 can be the length of time that the station 200 waits after the initial value of the T_SC 1406 has been set in the start identification step 1402 before the station 200 implements the user disambiguation block 310 of FIG. 3. It is contemplated that the T_SL 1410 can be set during the start identification step 1402 or can be preset before the station 200 is utilized by the active user 306.

The T_SL 1410 can be set or changed according to the length of time the active user 306 is expected to interact with the station 200 and based on the expected accuracy of the station 200 in determining the current user 314. Illustratively, the T_SL 1410 can be set to the current time plus the preset value or can simply be a preset value.

The C_R 1412 can be the RSSI 222 of the current signal 308 being processed from the beacons 100. The C_R 1412 can be cleared in the start identification step 1402.

The CRT 1414 can be used to determine a signal strength limit in dBm. The CRT 1414 is contemplated to be a threshold relative to the B1_R 1408. The C_R 1412 must be within the CRT 1414 range of B1_R 1408 to avoid being filtered out. It is contemplated that, as B1_R 1408 changes, the threshold filtering out the C_R 1412 can change also.

The CB 1416 can be the current beacon 100 being considered by the user identification step 904. The CB 1416 can transmit the C_R 1412. The CB 1416 can have the user ID 116 of FIG. 1 assigned as the CB_ID 1418.

The start identification step 1402 can be initiated by the countdown step 902 of FIG. 9. The station 200 can proceed from the start identification step 1402 to a disambiguation time limit decision step 1420.

The disambiguation time limit decision step 1420 can compare the T_SC 1406 with the T_SL 1410. If the T_SC 1406 is after the T_SL 1410, the disambiguation time limit decision step 1420 can return an affirmative result and activate the user disambiguation block 310 in a disambiguation step 1422.

The disambiguation step 1422 can be executed by the station 200 to determine the current user 314, the probabilities 312 of FIG. 3, and the scores 316 of FIG. 3. If the disambiguation time limit decision step 1420 determines that the T_SC 1406 is not after the T_SL 1410, the disambiguation time limit decision step 1420 can return a negative result.

A negative result from the disambiguation time limit decision step 1420 can trigger the execution of a new message received decision step 1424. The new message received decision step 1424 can be executed by the station 200 to determine whether the station communication unit 206 has detected the transmission of a signal 308 from the beacons 100 containing a new one of the messages 1120 of FIG. 11.

If the new message received decision step 1424 determines that none of the messages 1120 have been newly received, the new message received decision step 1424 can provide a negative result. When the new message received decision step 1424 provides a negative result the station 200 again executes the disambiguation time limit decision step 1420.

If the new message received decision step 1424 indicates that one of the messages 1120 has been newly received in the signal 308 from one of the beacons 100, the new message received decision step 1424 can provide an affirmative result. When the new message received decision step 1424 provides an affirmative result the station 200 can set the CB_ID 1418 to the user ID 116 contained in the message 1120 from the beacon 100.

Further, when the new message received decision step 1424 returns an affirmative result, the C_R 1412 can be set to the RSSI 222 of the signal 308 containing the new message 1120. Once the CB_ID 1418 and the C_R 1412 are set in the new message received decision step 1424, the station 200 can proceed to a known user in table decision step 1426.

The known user in table decision step 1426 can verify that the CB_ID 1418 of the CB 1416 is in the user ID table 216 of FIG. 2. If the CB_ID 1418 of the CB 1416 is not in the user ID table 216, then the known user in table decision step 1426 will return a negative result and the station 200 will then proceed to again execute the disambiguation time limit decision step 1420.

Alternatively it is contemplated that when the CB_ID 1418 is not found in the user ID table 216, the CB_ID 1418 may be further processed to extract a group ID or to determine whether the CB 1416 belongs to the approved category 221 of FIG. 2 that can be found in the user ID table 216. It is contemplated that the user ID table 216 may hold the approved category 221 as groups or categories of the users 302 that can be recognized as approved allowing the station 200 to proceed to a RSSI window decision step 1428 even when the CB_ID 1418 is not found in the user ID table 216.

When the CB_ID 1418 of the CB 1416 is confirmed to be within the user ID table 216, the known user in table decision step 1426 will return an affirmative result and the station 200 will proceed to execute an RSSI window decision step 1428. The RSSI window decision step 1428 can determine whether the C_R 1412 is greater than B1_R 1408 minus CRT 1414.

That is, the RSSI window decision step 1428 determines whether the C_R 1412 is above the threshold of the best RSSI 222 of the current scan by the station 200 minus the CRT 1414. When the RSSI window decision step 1428 determines that the C_R 1412 is not above the threshold B1_R 1408 minus CRT 1414 then the RSSI window decision step 1428 will return a negative result and the station 200 will again execute the disambiguation time limit decision step 1420.

When the RSSI window decision step 1428 determines that the C_R 1412 is above the threshold B1_R 1408 minus CRT 1414 then the RSSI window decision step 1428 will return a positive result and the station 200 will execute a filter candidates step 1430. The filter candidates step 1430 can be executed by the station 200 to determine whether the CB_ID 1418 should be added to the Match_List 218 and whether any of the user IDs 116 should be removed from the Match_List 218.

The station 200 can proceed from the filter candidates step 1430 to a build Match_List step 1432. During the build Match_List step 1432, the station 200 can add or remove the user IDs 116.

The station 200 can proceed from the build Match_List step 1432 to the disambiguation time limit decision step 1420. The disambiguation time limit decision step 1420 can also be executed by the station 200 as a result of a negative result from the ID decision step 914 of FIG. 9.

It is contemplated that the beacons 100 can transmit multiple signals 308 each having new messages 1120. It has been discovered that executing the user identification step 904 can help determine the user ID 116 of the current user 314 even when the signals 308 received by the station 200 from the beacon 100 of the active user 306 has multiple different RSSI 222 readings, including some of the signals 308 with a high RSSI 222 and other signals 308 with a low RSSI 222 reading for the same beacon 100.

Figure 15:
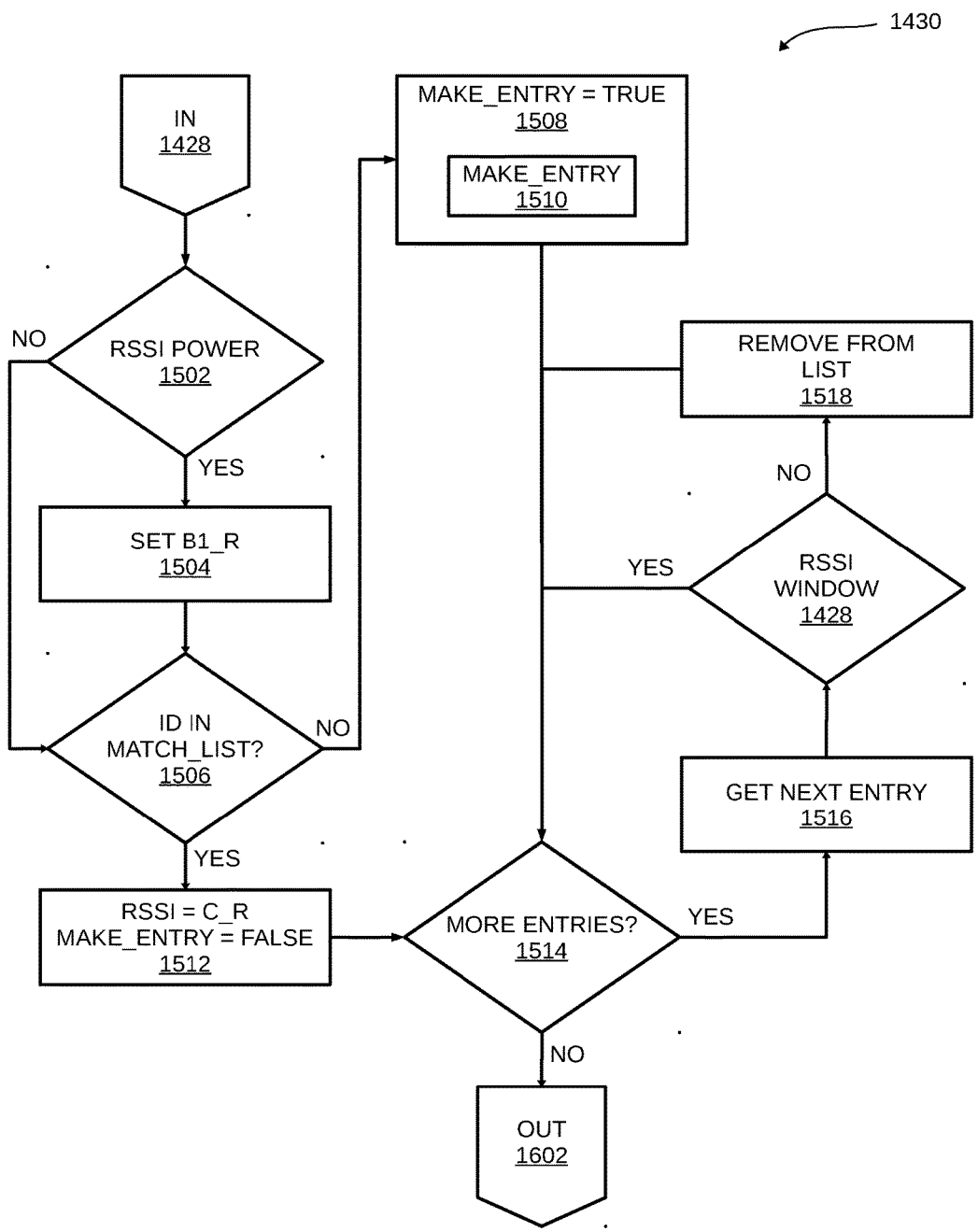
FIG. 15 is a control flow of the filter candidates step of FIG. 14.

Referring now to FIG. 15, therein is shown a control flow of the filter candidates step 1430 of FIG. 14. The filter candidates step 1430 can be executed by the station 200 of FIG. 2 when the RSSI window decision step 1428 of FIG. 14 determines that the C_R 1412 of FIG. 14 is above the threshold B1_R 1408 of FIG. 14 minus CRT 1414 of FIG. 14.

The filter candidates step 1430 can begin with an RSSI power decision step 1502. The RSSI power decision step 1502 can determine whether the C_R 1412 is greater than the B1_R 1408. That is, the RSSI power decision step 1502 determines whether the RSSI 222 of FIG. 2 for the signal 308 of FIG. 3 including the message 1120 of FIG. 11 currently being processed is higher than the highest RSSI 222 measured during the current scan by the station 200.

The station 200 can scan for the beacons 100 of FIG. 1 and can detect multiple beacons 100 during a single scan. The station 200 can then process each of the messages 1120 of each individual beacon 100 sequentially.

If the RSSI power decision step 1502 determines that the C_R 1412 of the current message 1120 is greater than the B1_R 1408, then the station 200 will proceed to execute a set B1_R step 1504. The set B1_R step 1504 can set B1_R 1408 to the C_R 1412.

Setting the B1_R 1408 to the C_R 1412 in the set B1_R step 1504 means that the RSSI 222 of the signal 308 having the current message 1120, is the highest RSSI 222 detected during the current scan for the messages 1120 processed up to this point.

If the RSSI power decision step 1502 determines that the C_R 1412 of the current message 1120 is not greater than the B1_R 1408, then the station 200 will proceed to execute an ID Match_List decision step 1506. The ID Match_List decision step 1506 can check and determine whether Match_List 218 of FIG. 2 contains an existing entry equal to the CB_ID 1418 of FIG. 14.

If the ID Match_List decision step 1506 determines that the CB_ID 1418 does not exist in the Match_List 218 then the ID Match_List decision step 1506 will return a negative result and the station 200 will proceed to execute a Make_Entry true step 1508. The Make_Entry true step 1508 can set one of the station parameters 1404 of FIG. 14.

The station parameter 1404 set by the Make_Entry true step 1508 is Make_Entry 1510. The Make_Entry 1510 can indicate whether a new entry should be made in the Match_List 218 for the CB 1416 of FIG. 14 later in the user identification step 904 of FIG. 9. The Make_Entry true step 1508 can set the Make_Entry 1510 to true.

If the ID Match_List decision step 1506 determines that the CB_ID 1418 does exist in the Match_List 218 then the ID Match_List decision step 1506 will return an affirmative result and the station 200 will proceed to execute a Make_Entry false step 1512. The Make_Entry false step 1512 can set the Make_Entry 1510 to false, which indicates that the station 200 should not create a new entry in the Match_List 218 for the CB 1416.

The Make_Entry false step 1512 can also set the RSSI 222 value that corresponds to the CB 1416 in the Match_List 218 to the C_R 1412 when the C_R 1412 is larger than the currently recorded RSSI 222 value in the Match_List 218. After the completion of the Make_Entry false step 1512 and the Make_Entry true step 1508, the station 200 can proceed to execute a more entry decision step 1514.

The more entry decision step 1514 can determine whether any more beacons 100 have the user IDs 116 of FIG. 1 in the Match_List 218. In addition, the more entry decision step 1514 can determine whether any more of the beacons 100 have the user IDs 116 that belong to a user category or user group contained in the Match_List 218. The more entry decision step 1514 can index sequentially through the Match_List 218.

If the more entry decision step 1514 determines that there are more entries in the Match_List 218 that have not been evaluated, the more entry decision step 1514 can return an affirmative result and the station 200 can execute a get next entry step 1516. The get next entry step 1516 can index to the next entry in the Match_List 218.

Once the get next entry step 1516 indexes to the next entry in the Match_List 218 the CB 1416, the CB_ID 1418, and the C_R 1412 can be updated to correspond to the entry in the Match_List 218 indexed by the get next entry step 1516. The station 200 can proceed to execute the RSSI window decision step 1428.

The RSSI window decision step 1428 can determine whether the C_R 1412 of the CB 1416 currently indexed by the get next entry step 1516 is greater than B1_R 1408 minus CRT 1414. When the RSSI window decision step 1428 determines that the C_R 1412 is not above the threshold B1_R 1408 minus CRT 1414 then the RSSI window decision step 1428 will return a negative result and the station 200 will execute a remove from list step 1518.

The remove from list step 1518 can remove the CB_ID 1418 and the C_R 1412 of the CB 1416 from the Match_List 218. Once the remove from list step 1518 is complete the more entry decision step 1514 can be again executed.

When the RSSI window decision step 1428 determines that the C_R 1412 is above the threshold B1_R 1408 minus CRT 1414 then the RSSI window decision step 1428 will return an affirmative result and the station 200 will again execute the more entry decision step 1514. If the more entry decision step 1514 determines that there are not any more entries in the Match_List 218 that should be evaluated, the more entry decision step 1514 can return a negative result and the station 200 can execute the build Match_List step 1432 of FIG. 14.

Figure 16:
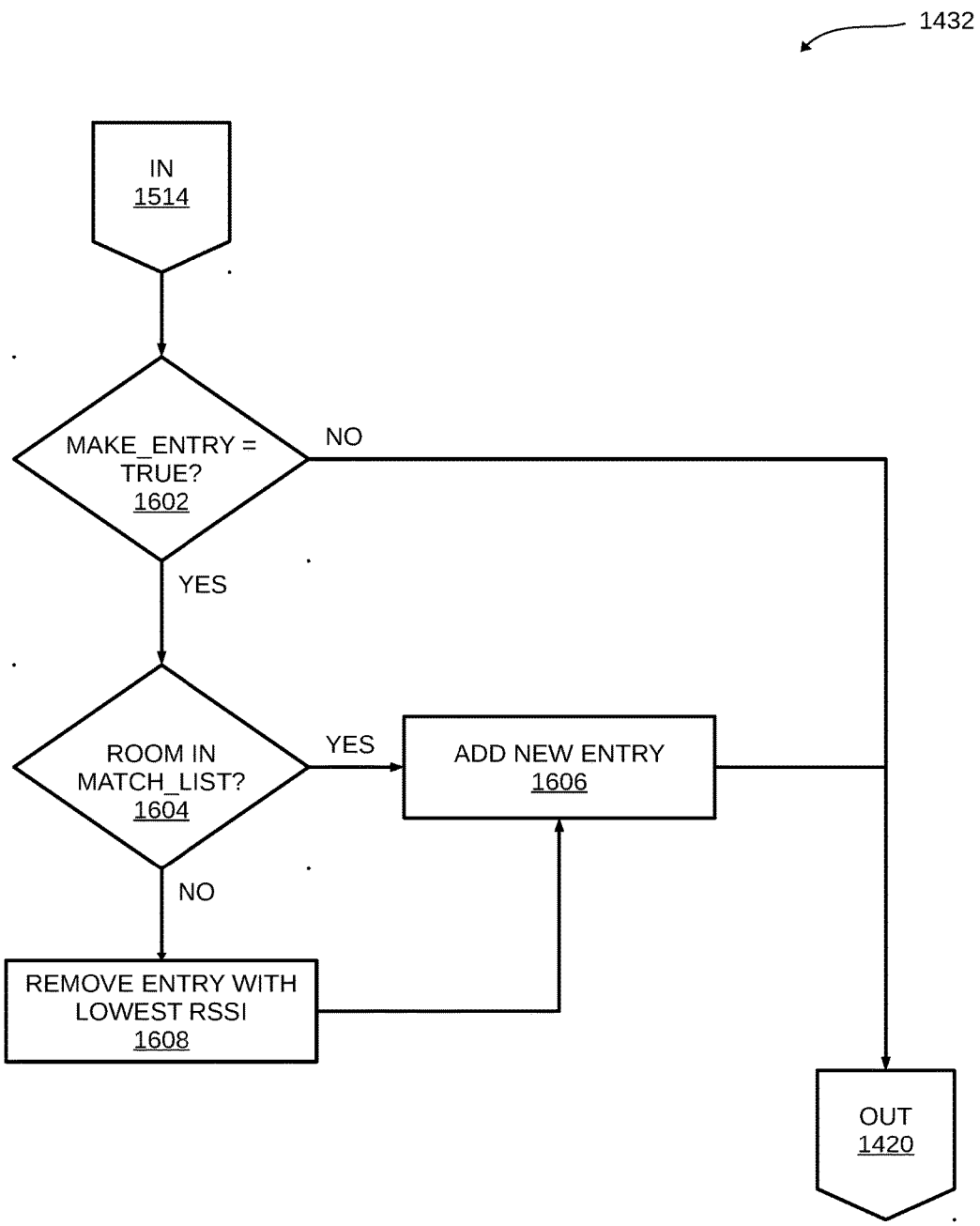
FIG. 16 is a control flow of the build Match_List step of FIG. 14.

Referring now to FIG. 16, therein is shown a control flow of the build Match_List step 1432 of FIG. 14. The build Match_List step 1432 can begin with a Make_Entry decision step 1602. The Make_Entry decision step 1602 can be executed and initiated by a negative result from the more entry decision step 1514 of FIG. 15.

The Make_Entry decision step 1602 can determine whether the Make_Entry 1510 of FIG. 15 is set to true. When the Make_Entry decision step 1602 determines that the Make_Entry 1510 is set to false then the Make_Entry decision step 1602 can provide a negative result and the station 200 of FIG. 2 can again execute the disambiguation time limit decision step 1420 of FIG. 14.

When the Make_Entry decision step 1602 determines that the Make_Entry 1510 is set to true then the Make_Entry decision step 1602 can provide an affirmative result and the station 200 can execute a Match_List room decision step 1604. The Match_List room decision step 1604 can determine whether there is an available space in the Match_List 218 of FIG. 2.

When the Match_List room decision step 1604 determines that there is space in the Match_List 218, the Match_List room decision step 1604 will return an affirmative result and the station 200 will execute an add new entry step 1606. The add new entry step 1606 can enter the CB_ID 1418 of FIG. 14 and the C_R 1412 of FIG. 14 for the CB 1416 of FIG. 14 to the Match_List 218.

Once the add new entry step 1606 adds the CB 1416 to the Match_List 218, the station 200 can again execute the disambiguation time limit decision step 1420. When the Match_List room decision step 1604 determines that there is no space in the Match_List 218, the Match_List room decision step 1604 will return a negative result and the station 200 will execute a remove lowest RSSI step 1608.

The remove lowest RSSI step 1608 will determine which entry in the Match_List 218 has the lowest RSSI 222 of FIG. 2 value and will delete the user ID 116 of FIG. 1 corresponding to the lowest RSSI 222. Once the remove lowest RSSI step 1608 completes the removal of the entry from the Match_List 218, the station 200 will execute the add new entry step 1606.

Figure 17:
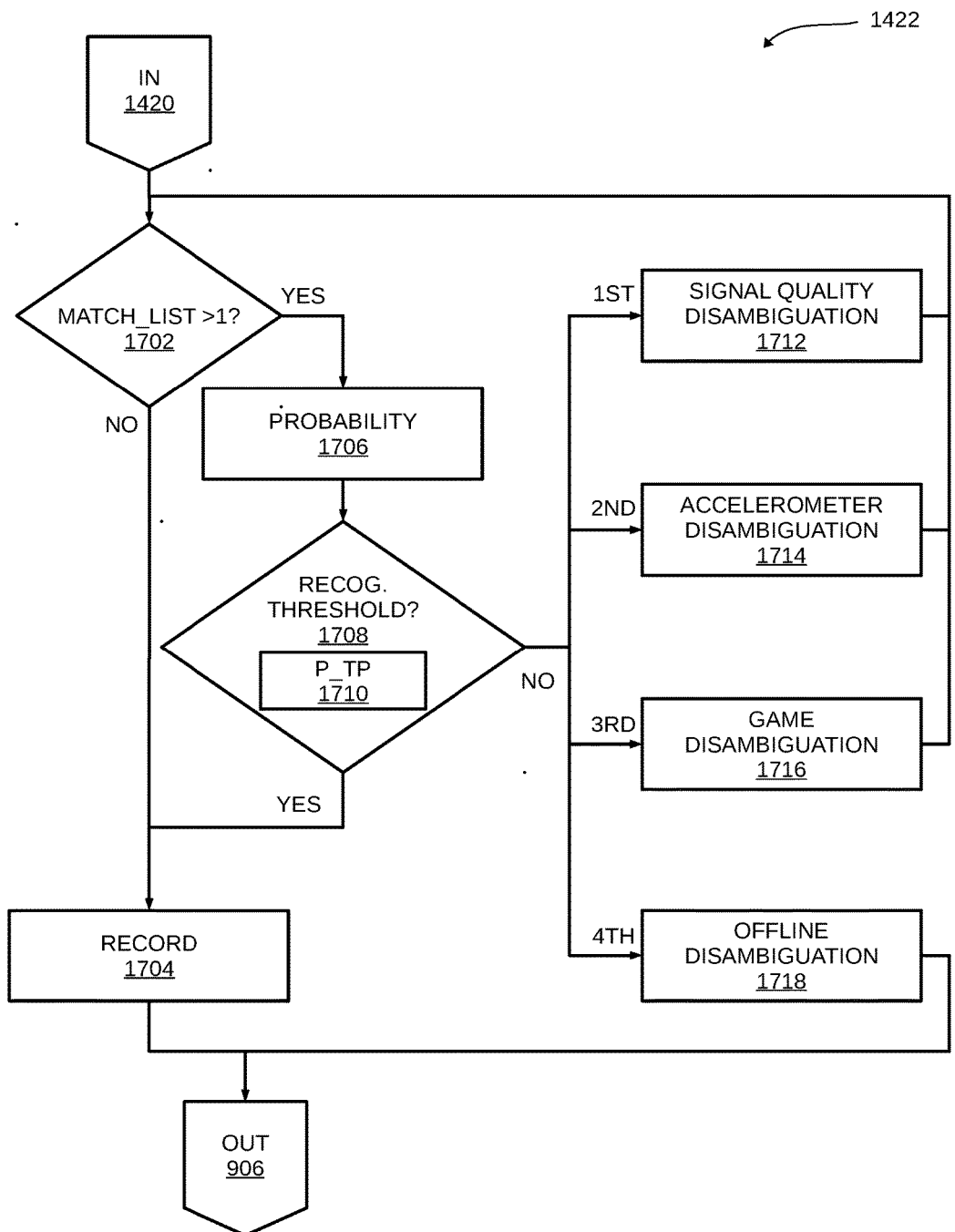
FIG. 17 is a control flow of the disambiguation step of FIG. 14.

Referring now to FIG. 17, therein is shown a control flow of the disambiguation step 1422 of FIG. 14. The disambiguation step 1422 can be executed by the station 200 of FIG. 2 once the disambiguation time limit decision step 1420 of FIG. 14 determines that the T_SC 1406 of FIG. 14 is after the T_SL 1410 of FIG. 14 and the disambiguation time limit decision step 1420 returns an affirmative result.

The disambiguation step 1422 can begin with a multiple user decision step 1702. The multiple user decision step 1702 can check the Match_List 218 of FIG. 2 and determine whether the Match_List 218 includes multiple user IDs 116 of FIG. 1 or whether the Match_List 218 includes only a single user ID 116.

If the multiple user decision step 1702 determines that the Match_List 218 includes only a single entry of the user ID 116 for a single user 302 of FIG. 3, then the multiple user decision step 1702 can return a negative result and the station 200 can then proceed to a record step 1704. The record step 1704 can record the user ID 116 in the Match_List 218 in the history record 318 of FIG. 3 and thereby assigning and recognizing the user ID 116, which is the CB_ID 1418 of FIG. 14, as the current user 314.

Once the CB_ID 1418 is recorded in the history record 318 as the current user 314, the station 200 can proceed to execute the countdown decision step 906 of FIG. 9. If the multiple user decision step 1702 determines that the Match_List 218 includes multiple entries of the user IDs 116 for multiple users 302, then the multiple user decision step 1702 can return an affirmative result and the station 200 can then proceed to a probability step 1706.

The probability step 1706 can utilize the scores 316 of FIG. 3 to calculate the probabilities 312 of FIG. 3 that the user IDs 116 in the Match_List 218 correspond to the active user 306 of FIG. 3. It is contemplated that when the station 200 executes the probability step 1706 for the first time during the user identification step 904, only the user IDs 116 broadcast by the beacons 100 and the RSSI 222 of FIG. 2 for the signal 308 of FIG. 3 broadcast by the beacons 100 will be available. When only the RSSI 222 is available, the probabilities 312 will depend primarily on the RSSI 222.

Illustratively, the beacons 100 with the strongest RSSI 222 could be calculated to have the highest probability of being coupled to the active user 306. It is further contemplated that the entries in the Match_List 218 could be filtered during the probability step 1706 by excluding any of the signals 308 coming from sources not found in the user ID table 216 of FIG. 2 either as an exact match or as a member of the approved category 221 of FIG. 2.

It has been discovered that filtering out the signals 308 that come from sources not in the user ID table 216 improves the user identification step 904 because only the RSSI 222 of beacons 100 that are in the user ID table 216 need to be obviously stronger than the other Match_List 218 entries. In this way a signal 308 that is very strong near to the station 200 but is not transmitted from a beacon 100 in the user ID table 216 will not ruin the identification of the current user 314 or the calculation of the probabilities 312.

The station 200 can proceed from the probability step 1706 to a recognition threshold decision step 1708. The recognition threshold decision step 1708 can determine whether the probability 312 of the entries in the Match_List 218 is above a threshold, P_TP 1710. The P_TP 1710 can be a probability of 99.9% or an error rate of 1 in 1000.

If the recognition threshold decision step 1708 determines that one of the user IDs 116 has the probability 312 above the P_TP 1710, the recognition threshold decision step 1708 will return an affirmative result and the station 200 will proceed to execute the record step 1704. If the recognition threshold decision step 1708 determines that none of the user IDs 116 has the probability 312 above the P_TP 1710, the recognition threshold decision step 1708 will return a negative result and the station 200 will proceed with further disambiguation measures.

It is contemplated that the station 200 can implement multiple different types of disambiguation measures to determine the scores 316 for each user ID 116 in the Match_List 218 and determine which user ID 116 should be identified as the current user 314. Specifically it is contemplated that a signal quality disambiguation step 1712, an accelerometer disambiguation step 1714, and a game disambiguation step 1716 can be executed by the station 200 to calculate the scores 316 used during the probability step 1706 to determine the probabilities 312.

It will be appreciated that the station 200 can implement different disambiguation measures based on how many times the recognition threshold decision step 1708 returns a negative result.

Illustratively, the first time the recognition threshold decision step 1708 returns a negative result the station 200 can execute the signal quality disambiguation step 1712. The second time the recognition threshold decision step 1708 returns a negative result the station 200 can execute the accelerometer disambiguation step 1714.

The third time the recognition threshold decision step 1708 returns a negative result the station 200 can execute the game disambiguation step 1716. The fourth time the recognition threshold decision step 1708 returns a negative result the station 200 can execute an off line disambiguation step 1718.

It is contemplated that once the station 200 executes either the signal quality disambiguation step 1712, the accelerometer disambiguation step 1714, or the game disambiguation step 1716, the station 200 can again execute the multiple user decision step 1702. When the station 200 completes the off line disambiguation step 1718, the station 200 can proceed to execute the countdown decision step 906.

It is contemplated that the signal quality disambiguation step 1712, the accelerometer disambiguation step 1714, and the game disambiguation step 1716 can be arranged in a different order to be executed by the station 200. It is further contemplated that the signal quality disambiguation step 1712, the accelerometer disambiguation step 1714, and the game disambiguation step 1716 can be ordered to be executed by the station 200 in a way that provides the best balance between power consumption of the beacons 100 and ambiguity reduction. Ambiguity reduction means the probability 312 that one of the beacons 100 can be identified as the current user 314 increases while the probability 312 that other beacons 100 are not the current user 314 decreases.

For example, the signal quality disambiguation step 1712, the accelerometer disambiguation step 1714, or the game disambiguation step 1716 may require much more power on the part of the beacons 100 and cut ambiguity in half, which decreases the error rate of the disambiguation step 1422. Conversely, the signal quality disambiguation step 1712, the accelerometer disambiguation step 1714, or the game disambiguation step 1716 might require only slightly more power consumption on the part of the beacons 100 and cut ambiguity by only 25%.

It is contemplated that the signal quality disambiguation step 1712, the accelerometer disambiguation step 1714, or the game disambiguation step 1716 can be executed in a different order based on the battery life of each specific beacon 100. That is if one of the beacons 100 has a low battery the station 200 might prioritize the execution of the disambiguation measures so the disambiguation measures with the lowest power requirements are executed first and the disambiguation measures with higher power requirements are executed later.

Alternatively, if one of the beacons 100 has a highly charged battery the station 200 might prioritize the execution of the disambiguation measures so the disambiguation measures that are the most effective at removing ambiguity are executed by the station 200 first while the disambiguation measures that are less effective are executed by the station 200 later. It is contemplated that a second factor in determining which order the signal quality disambiguation step 1712, the accelerometer disambiguation step 1714, or the game disambiguation step 1716 are executed can be the length of time that the disambiguation measure takes to complete.

For example, monitoring the beacon sensor data 122 of FIG. 1 from the beacon sensor unit 108 of FIG. 1 and correlating the beacon sensor data 122 with the station sensor data 224 of FIG. 2 as part of the execution of the accelerometer disambiguation step 1714 might be calculable quickly whereas providing the instructions 602 of FIG. 6 on the station user interface 210 of FIG. 2 as part of the execution of the game disambiguation step 1716 might take more time. In this situation the accelerometer disambiguation step 1714 might be ordered before the game disambiguation step 1716.

It has been discovered that the longer time the station 200 takes to identify the current user 314, the longer the time required before the station 200 displays the user's name 220 of FIG. 2 on the station user interface 210. By displaying the user's name 220 sooner, rather than later, the active user 306 may be better encouraged to complete the hand washing exercise (since they will understand that a high level of accountability and transparency is being achieved during the wash).

As depicted, the signal quality disambiguation step 1712 can be executed first by the station 200. During the signal quality disambiguation step 1712, the station 200 can send instructions to the beacons 100 to modify the beacon parameters 120, for example when the beacons 100 execute the receiving step 1036 of FIG. 10.

The beacon parameters 120 can be modified during the signal quality disambiguation step 1712 to change the frequency of the signal 308 transmitted by the beacons 100, the duration with which the beacons 100 transmit the signal 308, or how frequently the beacons 100 transmit the signal 308. The beacon parameters 120 can further be modified in the signal quality disambiguation step 1712 to increase the power of the signal 308 transmitted by the beacons 100.

It has been discovered that modifying the power, frequency, duration of the signals 308 transmitted by the beacons 100 can help to distinguish the beacons 100 and reduce the ambiguity of which beacon 100 should be considered the current user 314. It has further been discovered that increasing how frequently the beacons 100 transmit the signal 308 can provide increased data points that can reduce the ambiguity of which beacon 100 should be considered the current user 314.

During the accelerometer disambiguation step 1714, the station 200 can modify the beacon parameters 120, when the beacons 100 execute the receiving step 1036, and can instruct the beacons 100 to power up the beacon sensor unit 108, monitor the beacon sensor unit 108, and transmit the beacon sensor data 122 in the message 1120 of FIG. 11 of the signal 308. The station 200 can then compare the beacon sensor data 122 with the station sensor data 224.

During the game disambiguation step 1716, the station 200 can modify the beacon parameters 120, when the beacons 100 execute the receiving step 1036, and can instruct the beacons 100 to power up the beacon sensor unit 108, monitor the beacon sensor unit 108, and transmit the beacon sensor data 122 in the message 1120 of FIG. 11 of the signal 308. The station 200 can also provide the instructions 602 to the active user 306 to induce a specific movement. The station 200 can then compare the beacon sensor data 122 with the station sensor data 224.

It has been discovered that any significant leaning-like motion observed by the beacon sensor unit 108 of the beacons 100 can reduce the ambiguity that the beacon 100 sensing the motion is coupled to the active user 306. It has further been discovered that the beacon sensor data 122 indicating a leaning motion by the user 302 can indicate the orientation of the of the beacon 100 relative to the user 302 it is coupled to and that the motions detected by the beacon sensor unit 108 can be translated into motions of the space ship 604 of FIG. 6.

It is contemplated that communication latency during the game disambiguation step 1716 can be avoided by automatically depicting the space ship 604 moving out of the way of the comet 606 of FIG. 6 in anticipation of and before the station 200 recognizes such a motion from the beacon sensor data 122. It is contemplated that when the signal quality disambiguation step 1712, the accelerometer disambiguation step 1714, and the game disambiguation step 1716 do not enable the probability step 1706 to calculate the probability 312 that any of the beacons 100 are the current user 314 to a level above P_TP 1710, the station 200 can execute the off line disambiguation step 1718.

During the off line disambiguation step 1718 the active user 306 can be assigned an "Unknown ID". The interaction with the station 200, such as a hand washing compliance, can be credited to multiple users 302 or partial credit for the interaction with the station 200 might be given to multiple users 302.

It is contemplated that the off line disambiguation step 1718 could be completed at a later time and could analyze the history records 318 for the users 302 to resolve and identify the current user 314. It is further contemplated that the station 200 could display a code to the active user 306 or to request a signal from the active user 306 that can later be used to identify the current user 314 and assign credit for the interaction with the station 200 to the active user 306.

For example, the station 200 could prompt the active user 306 to show a hand sign of some kind to the station 200 that would be detected by the station sensor unit 208. Later, the active user 306 could log into an application on their phone, show the same hand sign, and be identified as the current user 314 during the interaction with the station 200.

Figure 18:
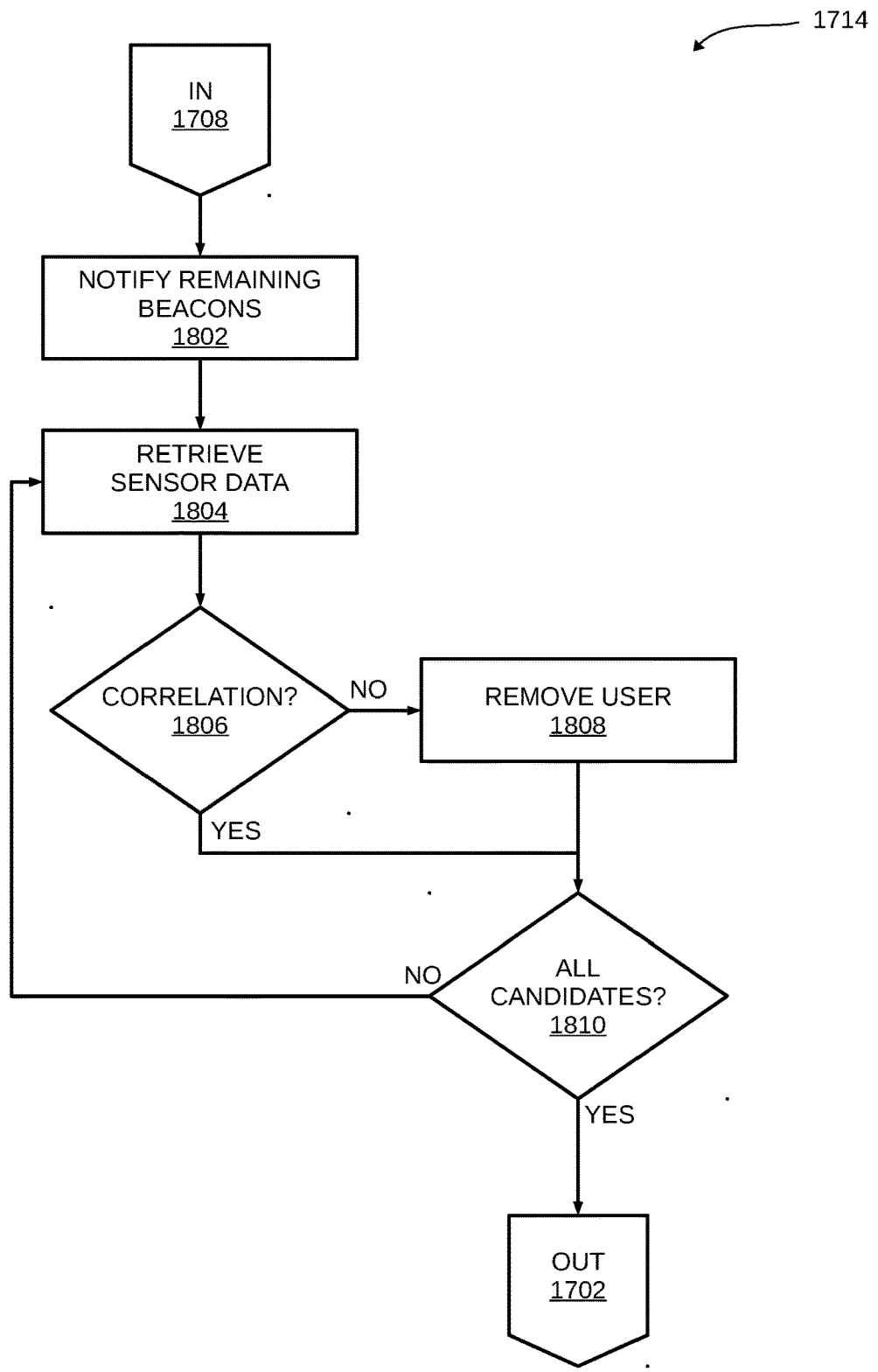
FIG. 18 is a control flow of the accelerometer disambiguation step of FIG. 17.

Referring now to FIG. 18, therein is shown a control flow of the accelerometer disambiguation step 1714 of FIG. 17.

The accelerometer disambiguation step 1714 can begin with a beacon notification step 1802.

The beacon notification step 1802 can transmit the message 1120 of FIG. 11 in the signal 308 of FIG. 3 to the beacons 100 of FIG. 1 that have the user IDs 116 of FIG. 1 remaining in the Match_List 218 of FIG. 2. The message 1120 from the station 200 of FIG. 2 can update the beacon parameters 120 of FIG. 1 for the beacons 100 and trigger the beacons 100 to power up the beacon sensor unit 108 of FIG. 1 and include the beacon sensor data 122 of FIG. 1 in the messages 1120 sent from the beacons 100 to the station 200.

The station 200 can further provide the beacon parameters 120 to broadcast the signal 308 more frequently. The beacon parameters 120 can be updated when the beacons 100 execute the receiving step 1036 of FIG. 10.

The station 200 can proceed from the beacon notification step 1802 to a retrieve sensor data step 1804. During the retrieve sensor data step 1804, the station 200 can detect the signal 308 from the beacons 100 using the station communication unit 206 of FIG. 2. The station 200 can isolate the beacon sensor data 122 from the message 1120 contained within the signal 308.

Further, during the retrieve sensor data step 1804, the station 200 can detect the station sensor data 224 of FIG. 2 from the station sensor unit 208 of FIG. 2. Once the station 200 has collected the beacon sensor data 122 and the station sensor data 224, the station 200 can proceed to execute a correlation decision step 1806.

During the correlation decision step 1806, the station 200 can determine whether sufficient correlation exists between the station sensor data 224 and the beacon sensor data 122. Multiple methods are contemplated for comparing the similarity of the beacon sensor data 122 to the station sensor data 224. One such method is the cross-correlation, which is commonly used for comparing one series of data collected over time to another such series. A higher correlation will produce a larger score 316 of FIG. 3 and indicate that the beacon 100 is more likely to be attached to the active user 306 of FIG. 3 that was performing the motions detected by the station sensor unit 208 of the station 200.

It is contemplated that when scores 316 are larger, the beacons 100 associated with the larger score 316 will be maintained as a candidate for the current user 314 of FIG. 3 on the Match_List 218. Conversely, when the scores 316 are lower, the correlation decision step 1806 can return a negative result and the station 200 can initiate a remove user step 1808.

During the remove user step 1808 the beacons 100 associated with the lower score 316 might be removed as a candidate for the current user 314 on the Match_List 218. Once the remove user step 1808 is complete or when the scores 316 are sufficiently high and the correlation decision step 1806 returns an affirmative result indicating that there is sufficient correlation, the station 200 can initiate an all candidates step 1810.

The all candidates step 1810 can determine whether each of the user IDs 116 of FIG. 1 in the Match_List 218 have been evaluated during the accelerometer disambiguation step 1714. If not all of the user IDs 116 have been evaluated, the all candidates step 1810 will return a negative result and the station 200 will index to the next user ID 116, and execute the retrieve sensor data step 1804. If all of the user IDs 116 have been evaluated, the all candidates step 1810 will return an affirmative result and the station 200 will execute the multiple user decision step 1702 of FIG. 17.

Figure 19:
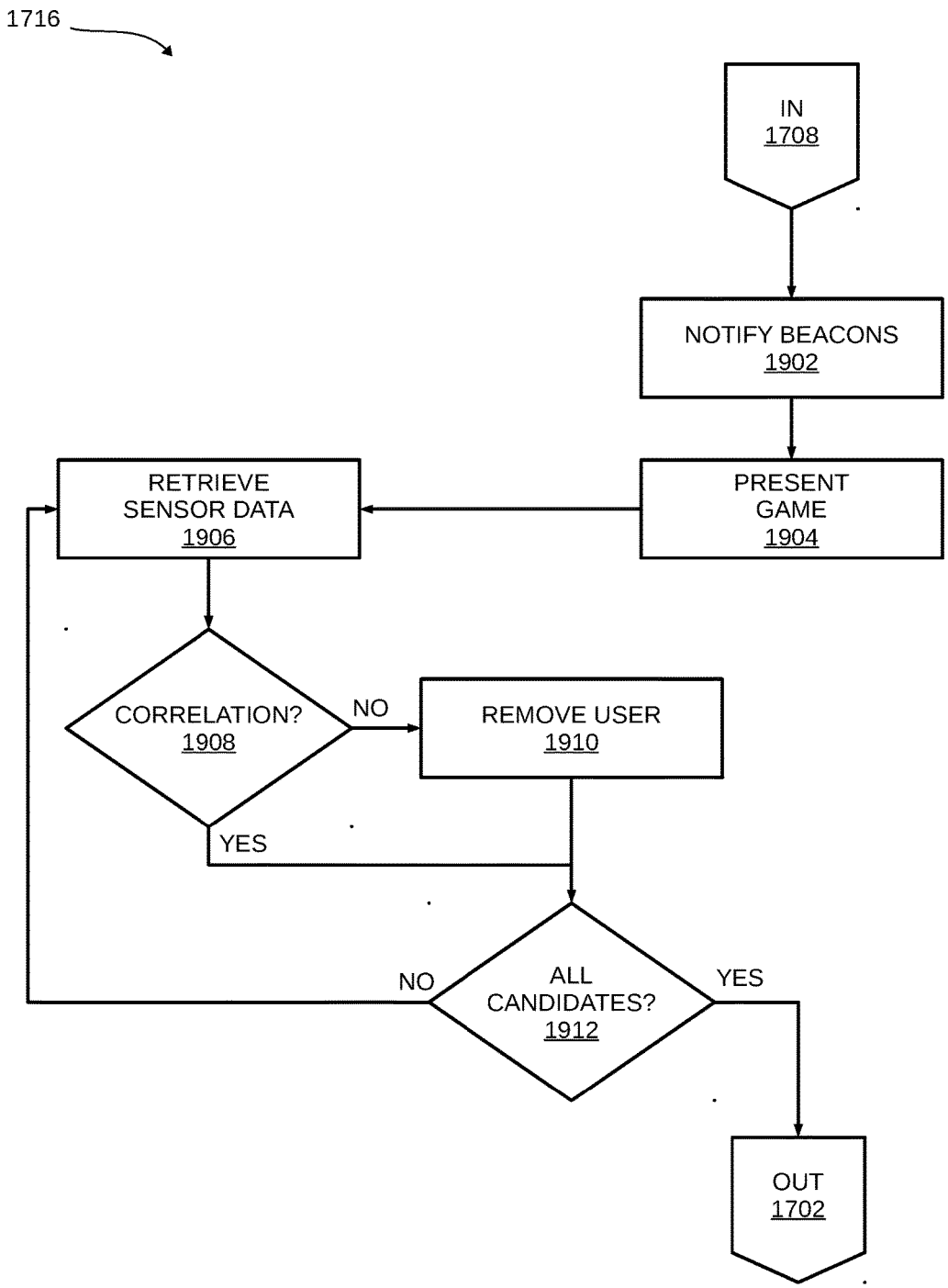
FIG. 19 is a control flow of the game disambiguation step of FIG. 17.

Referring now to FIG. 19, therein is shown a control flow of the game disambiguation step 1716 of FIG. 17. The game disambiguation step 1716 can begin with a beacon notification step 1902.

The beacon notification step 1902 can transmit the message 1120 of FIG. 11 in the signal 308 of FIG. 3 to the beacons 100 of FIG. 1 that have the user IDs 116 of FIG. 1 remaining in the Match_List 2218 of FIG. 2. The message 1120 from the station 200 of FIG. 2 can update the beacon parameters 120 of FIG. 1 for the beacons 100 and trigger the beacons 100 to power up the beacon sensor unit 108 of FIG. 1 and include the beacon sensor data 122 of FIG. 1 in the messages 1120 sent from the beacons 100 to the station 200.

The station 200 can further provide the beacon parameters 120 to broadcast the signal 308 more frequently. The beacon parameters 120 can be updated when the beacons 100 execute the receiving step 1036 of FIG. 10.

The station 200 can proceed from the beacon notification step 1902 to a present game step 1904. During the present game step 1904 the station 200 can display instructions 602 of FIG. 6 and the game of FIG. 6 including the space ship 604 of FIG. 6 and the comet 606 of FIG. 6 on the station user interface 210 of FIG. 2.

The station 200 can proceed from the present game step 1904 to a retrieve sensor data step 1906. During the retrieve sensor data step 1906, the station 200 can detect the signal 308 from the beacons 100 using the station communication unit 206 of FIG. 2. The station 200 can isolate the beacon sensor data 122 from the message 1120 contained within the signal 308.

Further, during the retrieve sensor data step 1906, the station 200 can detect the station sensor data 224 of FIG. 2 from the station sensor unit 208 of FIG. 2. Once the station 200 has collected the beacon sensor data 122 and the station sensor data 224, the station 200 can proceed to execute a correlation decision step 1908.

During the correlation decision step 1908, the station 200 can determine whether sufficient correlation exists between the station sensor data 224 and the beacon sensor data 122. Multiple methods are contemplated for comparing the similarity of the beacon sensor data 122 to the station sensor data 224.

One such method is the cross-correlation, which is commonly used for comparing one series of data collected over time to another such series. A higher correlation will produce a larger score 316 of FIG. 3 and indicate that the beacon 100 is more likely to be attached to the active user 306 of FIG. 3 that was performing the motions detected by the station sensor unit 208 of the station 200.

It is contemplated that when scores 316 are larger, the beacons 100 associated with the larger score 316 will be maintained as a candidate for the current user 314 of FIG. 3 on the Match_List 218. Conversely, when the scores 316 are lower, the correlation decision step 1908 can return a negative result and the station 200 can initiate a remove user step 1910.

During the remove user step 1910 the beacons 100 associated with the lower score 316 might be removed as a candidate for the current user 314 on the Match_List 218. After the remove user step 1910 or when the scores 316 are sufficiently high that the correlation decision step 1908 returns an affirmative result indicating that there is sufficient correlation, the station 200 can initiate an all candidates step 1912.

The all candidates step 1912 can determine whether each of the user IDs 116 of FIG. 1 in the Match_List 218 have been evaluated during the game disambiguation step 1716.

If not all of the user IDs 116 have been evaluated, the all candidates step 1912 will return a negative result and the station 200 will index to the next user ID 116, and execute the retrieve sensor data step 1906. If all of the user IDs 116 have been evaluated, the all candidates step 1912 will return an affirmative result and the station 200 will execute the multiple user decision step 1702 of FIG. 17.

Figure 20:
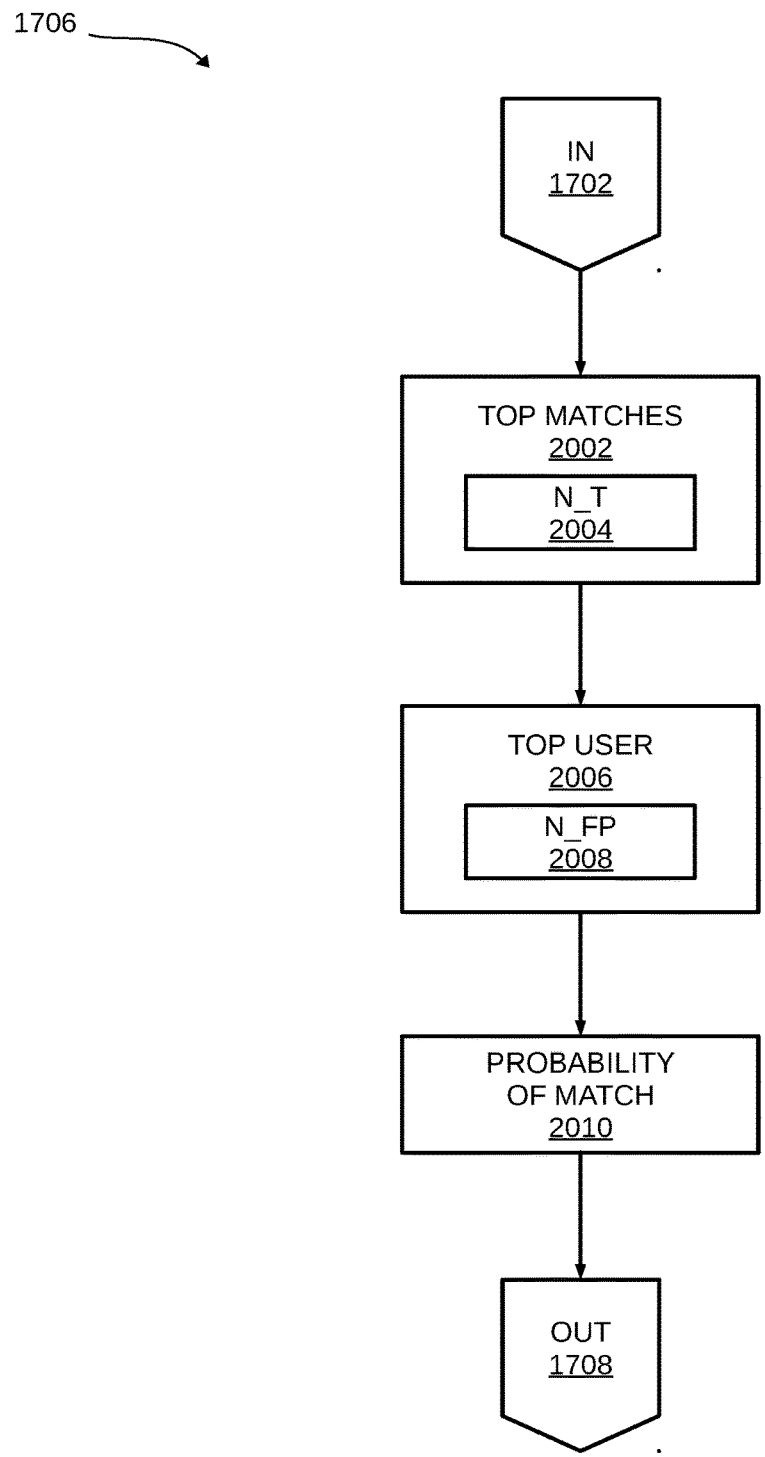
FIG. 20 is a control flow of the probability step of FIG. 17.

Referring now to FIG. 20, therein is shown a control flow of the probability step 1706 of FIG. 17. The probability step 1706 can calculate the probabilities 312 of FIG. 3. The probabilities 312 can be the probability of correct identification of the active user 306 of FIG. 3 as the current user 314 of FIG. 3.

The probability step 1706 can begin with a top matches step 2002. The top matches step 2002 can set one of the station parameters 1404 of FIG. 14, N_T 2004.

The N_T 2004 can be set to the number of records from the history record 318 of FIG. 3 where the highest score 316 of FIG. 3 for the candidate beacon 100 for the current user 314, of a previous interaction with the station 200, was at least as high as the current highest score 316 for the beacons 100 on the Match_List 218 of FIG. 3 and the second highest score 316 for the candidate beacon 100 for the current user 314, of a previous interaction with the station 200, was at least as low as the current second highest score 316 for the beacons 100 on the Match_List 218. It is contemplated that the N_T 2004 can be set by comparing the scores 316 from previous interactions with the station 200 where the identification of the current user 314 is known to be correct, such as with supervised data.

It is contemplated that the second highest score 316 for the candidate beacon 100 for the current user 314, of a previous interaction with the station 200, could be empty. That is it is contemplated that no beacon 100 would have a second highest score 316 from a previous interaction with the station 200 recorded in the history record 318.

The station 200 can proceed from top matches step 2002 to a top user check step 2006. The top user check step 2006 calculates the number of records from the N_T 2004 set in the top matches step 2002 that resulted in false-positive identifications of the current user 314 when using the current disambiguation measure. The number of false positives can be recorded in the station parameter 1404, N_FP 2008.

For example, it may be the case that 10 records exist where the best matching candidate had the score 316 equal or lower than the current best matching candidate beacon 100, and the second best matching candidate had the score 316 at least as high as the current second best matching candidate beacon 100.

In this case N_T 2004 would be 10. If the system displayed the best matching user name 220 of FIG. 2 to the active user 306 and was informed of an incorrect identification in one such instance, then N_FP 2008 would be 1. The station 200 can proceed from top user check step 2006 to a calculation step 2010.

During the calculation step 2010, the station 200 can calculate the probability 312 that the beacons 100 are coupled to the active user 306. The calculation step 2010 can identify the best matching beacon 100 from the Match_List 218.

The probabilities 312 for each of the beacons 100 on the Match_List 218 can be calculated by the formula 1−(N_FP/N_T). For example if N_T 2004=10, and N_FP 2008=1, then the probability 312 of the best matching candidate beacon 100 being coupled to the active user 306 is 1−(1/10)= 90%.

It is possible to get the user 302 of FIG. 3 to supervise the results of the user identification step 904 of FIG. 9 by prompting the active user 306 to confirm the user name 220 displayed on the station user interface 210 of FIG. 2 as a result of the user identification step 904 is correct. In this way the users 302 can provide the supervising information required by the top matches step 2002 and the top user check step 2006.

In this way it is possible for the active user 306 to provide supervising information even though the station 200 may not know with certainty what beacon 100 should be identified as the current user 314. It is contemplated that the users 302 can confirm the identification of user identification step 904 by showing a hand sign or motion to the station 200, which can be detected by the station sensor unit 208 of FIG. 2. In this way it is possible for the accuracy of the disambiguation system to improve over time as the accuracy of the probabilities 312 derived from disambiguation measures improve.

Thus, it has been discovered that the disambiguation system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the disambiguation system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A disambiguation method comprising:
   providing a station, the station including a station communication unit, a station control unit, and a station storage unit;
   receiving transmissions of signals containing messages from beacons, the transmissions received with the station communication unit;
   detecting identifications (IDs) from the messages, the IDs detected by processing the messages with the station control unit;
   detecting a received strength of the signals, the received strength detected with the station communication unit;
   adding the IDs to a list, the list being stored in the station storage unit, the IDs added to the list based on the received strength of the signals being above a predetermined amount of decibel-milliwatts below a best received strength of the signals processed by the station control unit at a time the IDs are processed by the station control unit;
   identifying one of the IDs as corresponding to an active user based on the list only having a single one of the IDs or based on a probability of the IDs being above a threshold, the active user being a user interfacing with the station; and disambiguating the IDs on the list based on the probability of the IDs being below the threshold, the IDs being disambiguated with the station control unit.

2. The method of claim 1 wherein adding the IDs to the list includes adding the IDs to the list based on the IDs being listed in an ID table, the ID table containing a list of the IDs recognized as valid by the station.

3. The method of claim 1 wherein adding the IDs to the list includes adding the IDs to the list based on the IDs being part of an approved category listed in an ID table.

4. The method of claim 1 wherein disambiguating the IDs includes instructing the beacons to increase how frequently the beacons transmit the signal, instructing the beacons to increase the power the signals are transmitted at, or a combination thereof.

5. The method of claim 1 wherein disambiguating the IDs includes:
   instructing the beacons to include beacon sensor data within the messages of the signals;
   detecting station sensor data from a station sensor unit; and
   correlating the beacon sensor data with the station sensor data.

6. The method of claim 1 wherein disambiguating the IDs includes:
   displaying movement instructions on a station user interface;
   instructing the beacons to include beacon sensor data within the messages of the signals;
   detecting station sensor data from a station sensor unit; and
   correlating the beacon sensor data with the station sensor data.

7. A non-transitory computer readable medium, useful in association with a processor, including instructions configured to:
   provide a station, the station including a station communication unit, a station control unit, and a station storage unit;
   receive transmissions of signals containing messages from beacons, the transmissions received with the station communication unit;
   detect identifications (IDs) from the messages, the IDs detected by processing the messages with the station control unit;
   detect a received strength of the signals, the received strength detected with the station communication unit;
   add the IDs to a list, the list being stored in the station storage unit, the IDs added to the list based on the received strength of the signals being above a predetermined amount of decibel-milliwatts below a best received strength of the signals processed by the station control unit at a time the IDs are processed by the station control unit; identify one of the IDs as corresponding to an active user based on the list only having a single one of the IDs or based on a probability of the IDs being above a threshold, the active user being a user interfacing with the station; and disambiguate the IDs on the list based on the probability of the IDs being below the threshold, the IDs being disambiguated with the station control unit.

8. The computer readable medium of claim 7 wherein the instructions configured to add the IDs to the list includes instructions configured to add the IDs to the list based on the IDs being listed in an ID table, the ID table containing a list of the IDs recognized as valid by the station.

9. The computer readable medium of claim 7 wherein the instructions configured to add the IDs to the list includes instructions configured to add the IDs to the list based on the IDs being part of an approved category listed in an ID table.

10. The computer readable medium of claim 7 wherein the instructions configured to disambiguate the IDs includes instructions configured to instruct the beacons to increase how frequently the beacons transmit the signal, instruct the beacons to increase the power the signals are transmitted at, or a combination thereof.

11. The computer readable medium of claim 7 wherein the instructions configured to disambiguate the IDs includes instructions configured to:
  instruct the beacons to include beacon sensor data within the messages of the signals;
  detect station sensor data from a station sensor unit; and
  correlate the beacon sensor data with the station sensor data.

12. The computer readable medium of claim 7 wherein the instructions configured to disambiguate the IDs includes instructions configured to:
  display movement instructions on a station user interface;
  instruct the beacons to include beacon sensor data within the messages of the signals;
  detect station sensor data from a station sensor unit; and
  correlate the beacon sensor data with the station sensor data.

13. A disambiguation system comprising:
  beacons configured to transmit signals containing messages, the messages containing identifications (IDs); and a station, the station including:
  a station communication unit configured to receive the transmissions of the signals and detect a received strength of the signals, a station storage unit configured to store the IDs on a list, and a station control unit configured to process the messages, detect the IDs, identifying one of the IDs as corresponding to an active user based on the list only having a single one of the IDs or based on a probability of the IDs being above a threshold, the active user being a user interfacing with the station, add the IDs to the list based on the received strength of the signals being above a predetermined amount of decibel-milliwatts below a best received strength of the signals processed by the station control unit at a time the IDs are processed by the station control, and disambiguate the IDs on the list based on the probability of the IDs being below the threshold.

14. The system of claim 13 wherein the station control unit is configured to add the IDs to the list based on the IDs being listed in an ID table, based on the IDs being part of an approved category listed in the ID table, or a combination thereof.

15. The system of claim 13 wherein the station control unit is configured to instruct the beacons to increase how frequently the beacons transmit the signal, instruct the beacons to increase the power the signals are transmitted at, or a combination thereof.

16. The system of claim 13 wherein the station control unit is configured to:
  instruct the beacons to include beacon sensor data within the messages of the signals;
  detect station sensor data from a station sensor unit; and
  correlate the beacon sensor data with the station sensor data.

17. The system of claim 13 wherein the station control unit is configured to:
  display movement instructions on a station user interface;
  instruct the beacons to include beacon sensor data within the messages of the signals;
  detect station sensor data from a station sensor unit; and
  correlate the beacon sensor data with the station sensor data.

* * * * *